US011168860B1

(12) United States Patent
Bak et al.

(10) Patent No.: US 11,168,860 B1
(45) Date of Patent: Nov. 9, 2021

(54) AUTOMOTIVE LAMP

(71) Applicant: SL Corporation, Daegu (KR)

(72) Inventors: Minseok Bak, Gyeongsan-si (KR); Kyungsu Lee, Gyeongsan-si (KR); Jiho Hong, Gyeongsan-si (KR); Changseob Jeong, Gyeongsan-si (KR); Seongwon Choi, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/313,165

(22) Filed: May 6, 2021

(30) Foreign Application Priority Data

May 7, 2020 (KR) ........................ 10-2020-0054550
Mar. 24, 2021 (KR) ........................ 10-2021-0037667

(51) Int. Cl.
*B60Q 1/04* (2006.01)
*F21S 41/365* (2018.01)
*F21S 41/24* (2018.01)
*F21S 41/39* (2018.01)
*F21S 41/143* (2018.01)
*F21S 41/25* (2018.01)
*F21W 102/13* (2018.01)

(52) U.S. Cl.
CPC ........... *F21S 41/365* (2018.01); *F21S 41/143* (2018.01); *F21S 41/24* (2018.01); *F21S 41/25* (2018.01); *F21S 41/39* (2018.01); *F21W 2102/13* (2018.01)

(58) Field of Classification Search
None
See application file for complete search history.

(56) References Cited

U.S. PATENT DOCUMENTS

2009/0161338 A1* 6/2009 Teranishi ............... G03B 15/05 362/12
2010/0309440 A1* 12/2010 Yamagishi ........... G02B 6/2808 353/37
2018/0112853 A1* 4/2018 Son ......................... F21S 45/47
2020/0072431 A1* 3/2020 Shih ........................ F21S 41/19

* cited by examiner

*Primary Examiner* — Elmito Breval
(74) *Attorney, Agent, or Firm* — Nelson Mullins Riley & Scarborough LLP; Kongsik Kim, Esq.

(57) ABSTRACT

An automotive lamp comprises a first light source for generating light, a light guide unit including a first rod to which the light is incident, a reflector unit for reflecting the light emitted from the light guide unit through the first rod, and a lens unit for forming a first beam pattern by transmitting at least a part of the light reflected by the reflector unit. The reflector unit comprises a first reflector member for reflecting a first light among the light emitted from the light guide unit through the first rod, a second reflector member disposed in front of the first reflector member for reflecting a second light among the light emitted from the light guide unit through the first rod and the first light, and a third reflector member disposed below the second reflector member for reflecting the first light and the second light.

20 Claims, 28 Drawing Sheets

Related Art

AUTOMOTIVE LAMP

CROSS-REFERENCE TO RELATED APPLICATIONS

This application claims priority to Korean Patent Application No. 10-2020-0054550, filed on May 7, 2020 and Korean Patent Application No. 10-2021-0037667, filed on Mar. 24, 2021, which applications are incorporated herein by reference in their entireties.

BACKGROUND

1. Technical Field

The present disclosure relates to an automotive lamp, and more particularly, to an automotive lamp arranged on both sides of a front of a vehicle, which irradiates a beam pattern for securing a front view, and forms a high beam pattern and a sub low beam pattern when the vehicle is operating in a low-light environment.

2. Related Art

In general, vehicles include various types of lamps having an illumination function for easily identifying objects located around the vehicle in the low-light conditions (e.g., during night-time driving) and a signaling function for informing other vehicles or road users of the driving state of the vehicle.

For example, head lamps and fog lamps are provided mainly for the purpose of illumination functions, and turn signal lamps, tail lamps, brake lamps, and side markers are provided for the purpose of signaling functions. These lamps are stipulated by regulations regarding their installation standards and requirements so that each function is sufficiently performed.

When a vehicle drives in a low-light environment such as at night, the head lamp forms a low beam pattern or a high beam pattern to secure a driver's front view, and plays an important role in safe driving. In such a head lamp, a low beam pattern or a high beam pattern based on the operation of the shield member is selectively formed from a single lamp module, or in some cases, a low beam pattern and a high beam pattern are respectively provided by separate lamp modules.

For example, as shown in FIGS. 1A and 1B, a conventional lamp includes a first light source 1, a light guide unit 2, a first reflector 3, a second reflector 4, a lens unit 5, and a second light source 6. Accordingly, as shown in FIG. 1A, the light formed by the first light source 1 passes through the light guide unit 2, is reflected by the first reflector 3 and the second reflector 4, and is incident on the lens unit 5 to form a sub low beam pattern. On the other hand, as shown in FIG. 1B, the light formed by the second light source 6 is directly incident on the lens unit 5 to form a high beam pattern.

Accordingly, the conventional lamp mainly maintains the low beam pattern and the sub low beam pattern in normal times to prevent causing glare to the driver of the on-coming vehicle or the driver of the preceding vehicle, and when driving at high speed or when driving in a low-light condition, forms a high beam pattern as necessary to promote safe driving.

However, as shown in FIG. 1A, the conventional lamp has a problem of light leakage, such as the light that falls behind the second reflector 4 unit, and a shadow area is generated on the illumination image so that a non-uniform illumination image is formed.

Further, head lamps mainly maintain a low beam pattern during normal times to prevent causing glare to the driver of the on-coming vehicle or the driver of the preceding vehicle, and when driving at high speeds or when driving in a low-light condition, form a high beam pattern as necessary to promote safe driving.

However, in the automotive head lamps, in which the head lamp forming the low beam pattern and the head lamp forming the high beam pattern are provided as separate lamp modules, while driving with the low beam pattern maintained in normal times, only the head lamp for forming the low beam pattern is turned on, and the head lamp for forming the high beam pattern remains turned off, and accordingly, there is a concern that pedestrians or drivers of other vehicles cannot properly recognize the location of the vehicle.

Further, there is a concern that the aesthetics are deteriorated since only one of the two head lamps is illuminated.

SUMMARY

The present disclosure may provide an automotive lamp with improved aesthetics even when the second light source is not turned on according to the formation of a low beam pattern. Further, an automotive lamp may be capable of reducing light leakage when forming the first beam pattern. Further, an automotive lamp may form a high beam pattern and a sub low beam pattern with a single lamp module.

In order to achieve the above object, an automotive lamp according to an exemplary embodiment of the present disclosure may include a first light source for generating light, a light guide unit including a first rod, to which the light is incident, a reflector unit for reflecting the light emitted from the light guide unit through the first rod, and a lens unit for forming a first beam pattern by transmitting at least a part of the light reflected by the reflector unit through the lens unit. The reflector unit may include a first reflector member for reflecting a first light, which is a part of the light emitted from the light guide unit through the first rod, a second reflector member disposed in front of the first reflector member for reflecting a second light, which is a part of the light emitted from the light guide unit through the first rod, and the first light reflected from the first reflector member, and a third reflector member disposed below the second reflector member for reflecting the first light and the second light reflected from the second reflector member.

The first reflector member may be disposed between the second reflector member and the third reflector member. The third reflector member may include a front reflector part for reflecting a part of light reflected from the second reflector member to the lens unit, and a rear reflector part for reflecting light reflected to a rear of the front reflector member among the light reflected from the second reflector member. A slope of the front reflector part may be greater than a slope of the rear reflector part with respect to an optical axis of the lens unit.

The automotive lamp may further include at least one second light source for generating light, and the light guide unit may further include at least one second rod, to which the light generated from the second light source is incident. The lens unit may form a second beam pattern by transmitting the light emitted from the light guide unit through the second rod through the lens unit. A third light, which is a part of the light emitted from the light guide unit through the second rod, may be incident on the lens unit, and a fourth light, which is a part of the light emitted from the light guide unit through the second rod, may be reflected by the rear reflector part and be incident on the lens unit. The fourth light may be irradiated to an upper area of the second beam pattern.

Further, the reflector unit may further include a first connection member for connecting the first reflector member and the second reflector member, and forming a first through hole, through which the first light and the second light pass, and a second connection member for connecting the first reflector member and the third reflector member, and forming a second through hole, through which the first light and the second light reflected from the second reflector member and third reflector member pass. The second connection member may include a protrusion that protrudes in a direction toward the light guide unit. The first beam pattern may correspond to a sub low beam pattern, and the second beam pattern may correspond to a high beam pattern.

An automotive lamp according to an exemplary embodiment of the present disclosure may include a first light source for irradiating a first light, a first lens for reflecting the first light by a first reflector to form a first reflected light, a second reflector for reflecting the first reflected light to form a second reflected light, a second lens for transmitting the second reflected light to form a first beam pattern, a second light source for irradiating a second light that is transmitted through the first lens and the second lens to form a second beam pattern, and a lens bracket for fixing the first lens to the first light source.

The first lens may include a first guide rod for guiding the first light to the first reflector. The first light that is incident into the first lens through the first guide rod may be reflected on a reflective surface of the first reflector and emitted to outside of the first lens. The first lens may be made of a silicone material. The lens bracket may include a cover unit for covering a reflective surface of the first reflector.

The second reflector may be provided integrally with the first lens. Alternatively, the second reflector may be provided integrally with the lens bracket. The lens bracket may be made of a resin material or a metal material, and the second reflector may include a reflective layer formed by applying a reflective material.

The first reflector may reflect the first light that is incident in a substantially horizontal direction in a downwardly inclined direction to form the first reflected light, and the second reflector reflects the first reflected light in an upwardly inclined direction to form the second reflected light. The first beam pattern may correspond to a sub low beam pattern, and the second beam pattern may correspond to a high beam pattern.

In the automotive lamp according to the exemplary embodiment of the present disclosure as described herein, even if the plurality of second light sources are not turned on, the first beam pattern can be formed by the light generated from the first light source, thereby increasing the aesthetics of the automotive lamp. Further, since at least one of the first reflector member and the rear reflector member is provided, when the first beam pattern is formed, an illumination image may be formed without a shadow area. Further, the structure of the device may be simplified by forming a high beam pattern and a sub low beam pattern with a single module.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
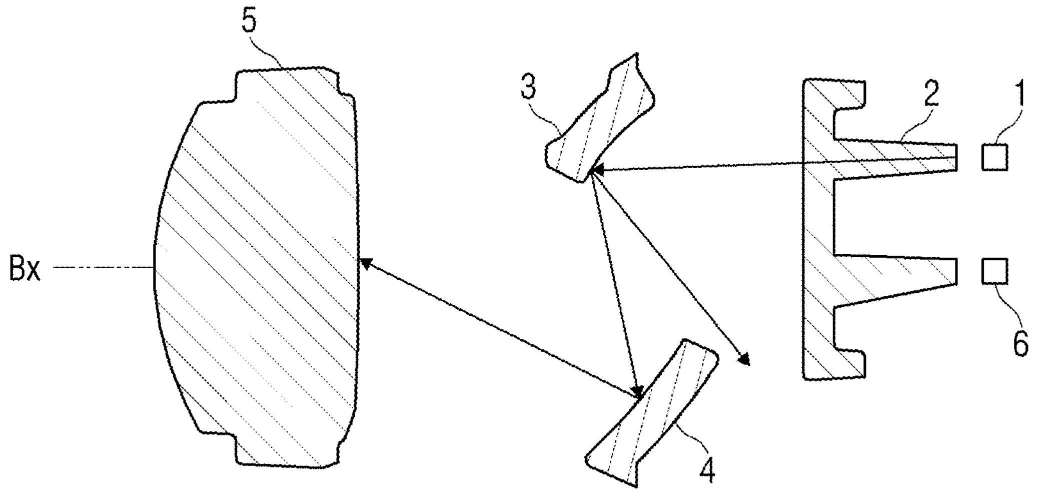
FIGS. 1A and 1B show a conventional lamp in the related art.
Figure 1B:
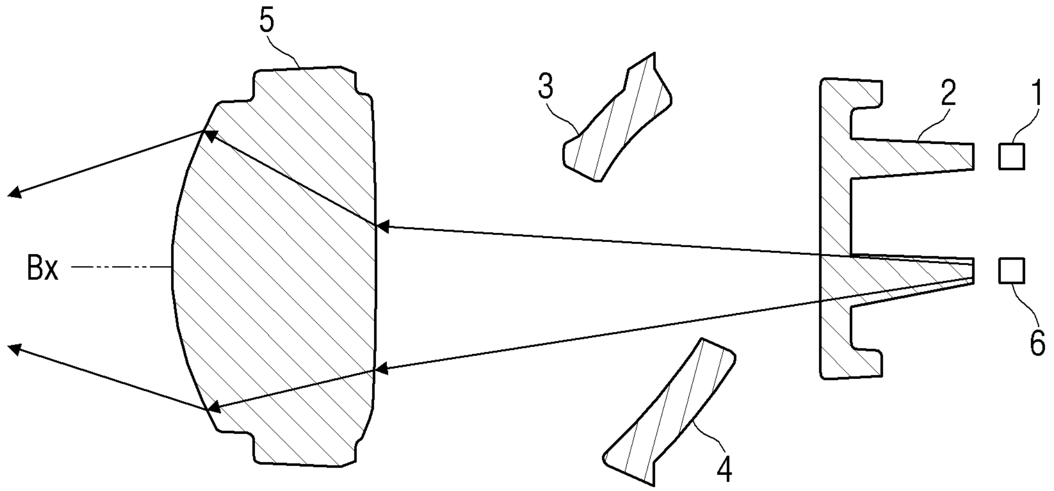
Related Art FIG. 1B

Hereinafter, exemplary embodiments of the present disclosure will be described in detail with reference to the accompanying drawings. Advantages and features of the present disclosure, and a method of achieving them will be apparent with reference to the exemplary embodiments described below in detail together with the accompanying drawings. However, the present disclosure is not limited to the exemplary embodiments to be described below, but may be implemented in various different forms, and these exemplary embodiments are only provided to make the disclosures complete, and to fully inform the scope of the disclosure to those of ordinary skill in the technical field to which the present disclosure belongs. Further, the invention is only defined by the scope of the claims. The same reference numerals refer to the same components throughout the specification.

Figure 2:
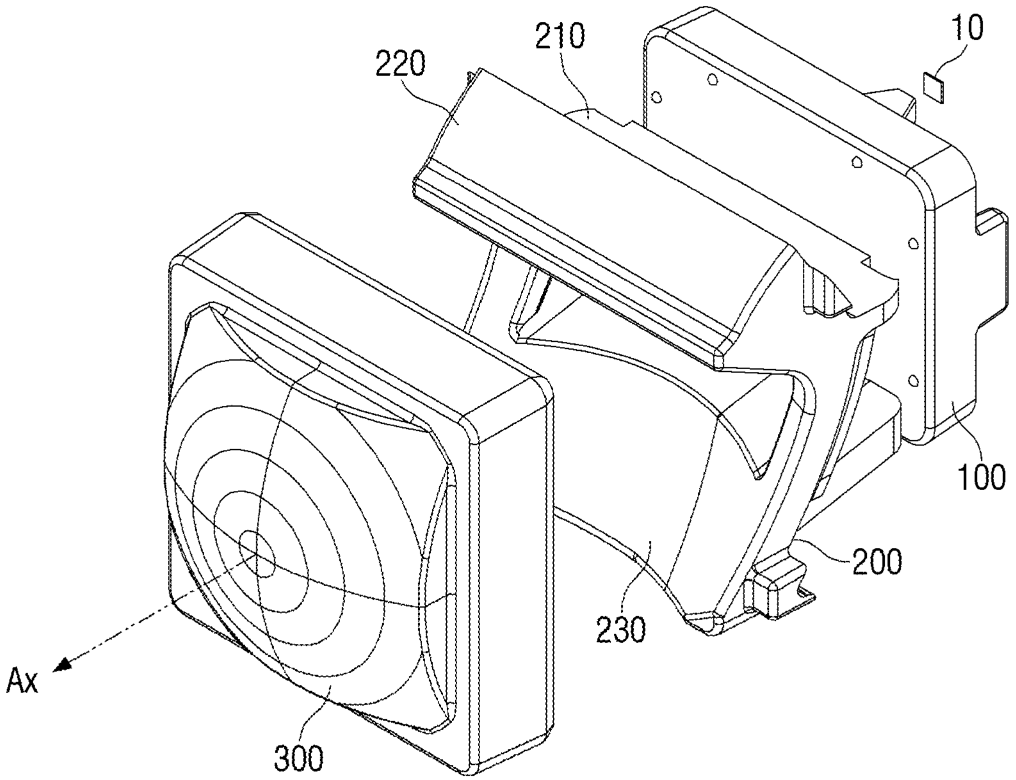
FIGS. 2 to 4 show an automotive lamp according to an exemplary embodiment of the present disclosure.
Figure 3:
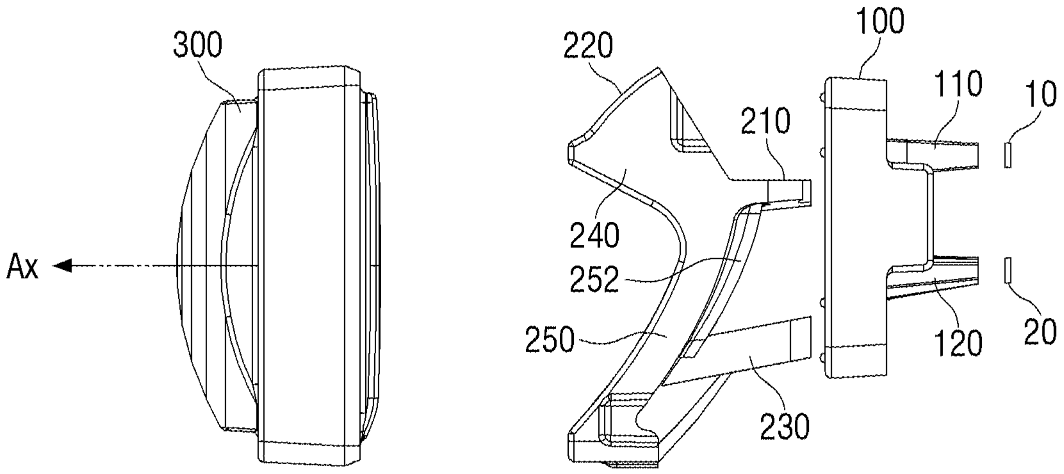
Figure 4:
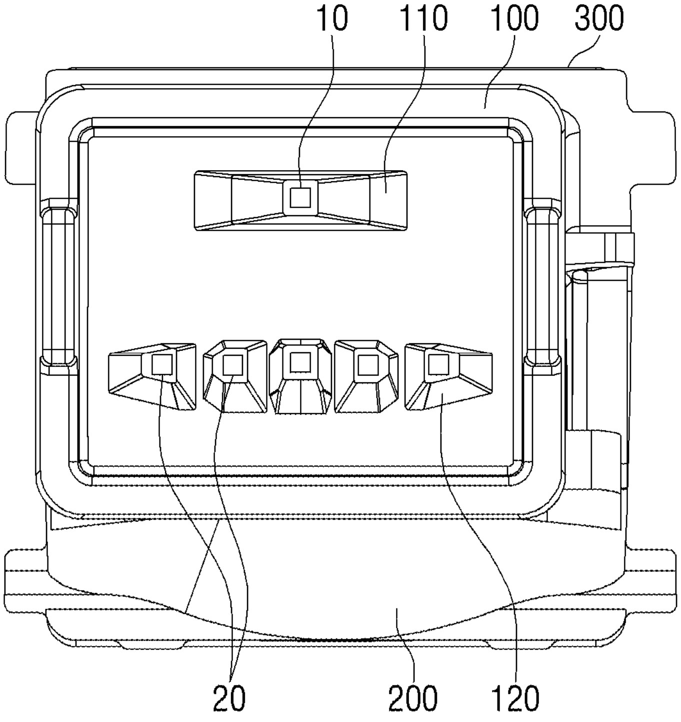

FIGS. 2 to 4 show an automotive lamp according to an exemplary embodiment of the present disclosure. An automotive lamp according to an exemplary embodiment of the present disclosure may be formed as an automotive head lamp that includes a first lamp unit, which forms a high beam pattern in order for a driver to secure a long-distance view while the vehicle is operating, and a second lamp unit, which forms a low beam pattern.

In the description of the automotive lamp of the present disclosure, the first lamp unit will be mainly described, and the sub low beam pattern to be described later may be formed at the same time as the low beam pattern of the second lamp unit. Further, the automotive lamp may be classified into a dynamic type and a matrix type. The dynamic type changes the angle of the lamp by a swivel actuator when the on-coming vehicle or the preceding vehicle is detected while driving, thereby forming a shadow area in the area around the location of the on-coming vehicle or the preceding vehicle, and the matrix type selectively turns on or off some of a plurality of light sources, thereby forming a shadow area in the spot that corresponds to the location of the on-coming vehicle or the preceding vehicle. The first lamp unit of the automotive lamp according to the exemplary embodiment of the present disclosure will be described based on an example of the matrix type among the two types mentioned above.

Referring to FIGS. 2 to 4, the first lamp unit of the automotive lamp according to the exemplary embodiment of the present disclosure may include a first light source 10, a second light source 20, a light guide unit 100, a reflector unit 200, and a lens unit 300.

The first light source 10 and the second light source 20 may generate light having a light quantity and/or color suitable for the use in the automotive lamp of the present disclosure, and a light emitting diode (LED) semiconductor light emitting device may be used. However, the present disclosure is not limited thereto, and LD (Laser Diode) or bulb type lamps may be used as a light source. As the bulb type lamp, a halogen lamp or a high intensity discharge (HID) lamp may be used. Further, depending on the design requirements, a plurality of the first light sources 10 and a plurality of the second light sources 20 may be used. Here, as at least one light source among the plurality of second light sources 20 may be selectively turned on or turned off, a shadow area may be formed in some area of the second beam pattern.

The light guide unit 100 may guide the light generated by the first light source 10 and the second light source 20 forward. Specifically, the light guide unit 100 may include a first rod 110 and a second rod 120 to which each light generated from the first light source 10 and the second light source 20 is incident.

The first rod 110 and the second rod 120 may be respectively formed in a tapered shape, such that the area gradually widens, so that the light generated from the first light source 10 and the second light source 20 may be diffused and guided forward. Further, a plurality of the first rods 110 and the second rods 120 may be formed according to the number of the first light sources 10 and the second light sources 20. The first rod 110 may be disposed above the second rod 120 although other configurations are also possible. Accordingly, the first light source 10 also may be disposed above the second light source 20.

The reflector unit 200 may reflect at least a part of the light emitted from the light guide unit 100. In other words, at least a part of the light emitted from the light guide unit 100 through the first rod 110 and at least a part of the light emitted from the light guide unit 100 through the second rod 120 may be reflected to the lens unit 300.

The lens unit 300 may form a first beam pattern and a second beam pattern as the light emitted from the light guide unit 100 and the light reflected from the reflector unit 200 are transmitted. Specifically, as the light emitted from the light guide unit 100 through the first rod 110 is transmitted through the lens unit 300, a first beam pattern may be formed, and as the light emitted from the light guide unit 100 through the second rod 120 is transmitted through the lens unit 300, a second beam pattern may be formed. The first beam pattern may form a sub low beam pattern, and the second beam pattern may form a high beam pattern. However, the present disclosure is not limited to such designation.

Accordingly, when the above-mentioned second lamp unit is turned on to form a low beam pattern, even if the second light source 20 is turned off in the first lamp unit, the first beam pattern may be formed as the first light source 10 is turned on. Accordingly, since light is generated in all lamp units, the aesthetics can be improved.

The second beam pattern may be formed of a plurality of divided patterns by light emitted from the plurality of second light sources 20. For example, a camera attached to the vehicle may capture real-time images of the front of the vehicle, while the vehicle is proceeding, and the sensing unit may detect the location of the on-coming vehicle or the preceding vehicle based on the captured images. A control unit (not shown) may selectively control the light from some of the plurality of second light sources 20 to be turned off or dimmed based on the detected signal, and may remove some of the divided patterns that are irradiated to the spot corresponding to the location of the on-coming vehicle or the preceding vehicle, thereby forming a shadow area.

Therefore, the driver's safety can be enhanced since the driver's long-distance view may be secured by the low beam pattern and the high beam pattern. Further, since the glare can be prevented for the drivers of other vehicles by removing some of the divided patterns at the area where the on-coming vehicle or the preceding vehicle is located among the second beam patterns, in response to detecting the on-coming vehicle or the preceding vehicle at that area.

Further, in order to prevent glare caused to the driver of the on-coming vehicle or the driver of the preceding vehicle, the plurality of second light sources 20 may be turned off in normal times (e.g., when a long-distance view is not required), the second lamp unit may be turned on to maintain the low beam pattern, and at the same time, at least one first light source 10 may be turned on to form the first beam pattern (e.g., the sub low beam pattern).

Meanwhile, the light guide unit 100 and the lens unit 300 may be made of a light-transmitting material such as glass, synthetic resin, or silicone.

In the automotive lamp according to the exemplary embodiment of the present disclosure, in order to efficiently form a uniform illumination image, the reflector unit 200 may include a first reflector member 210, a second reflector member 220, and a third reflector member 230.

Figure 5:
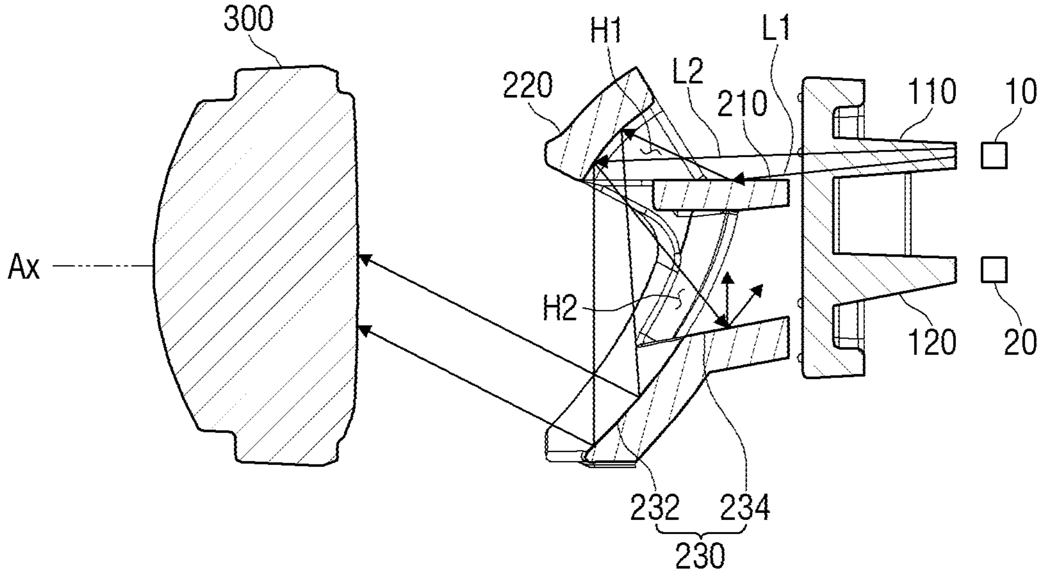
FIG. 5 shows a path of light generated from a first light source according to an exemplary embodiment of the present disclosure.

Referring to FIG. 5, the first reflector member 210 may reflect the first light (L1), which is a part of the light emitted from the light guide unit 100 through the first rod 110. The second reflector member 220 may be disposed in front of the first reflector member 210 and may reflect the second light (L2), which is a part of the light emitted from the light guide unit 100 through the first rod 110, as well as the first light (L1) reflected from the first reflector member 210. The third reflector member 230 may be disposed below the second reflector member 220 and may reflect the first light (L1) reflected from the second reflector member 220 and the second light (L2) reflected from the second reflector member 220. Specifically, the second reflector member 220 may be disposed in front of the first reflector member 210, and the first reflector member 210 may be disposed between the second reflector member 220 and the third reflector member 230.

As described above, the first reflector member 210 may deliver more light to the lens unit 300. In other words, the first light (L1) reflected from the first reflector member 210 may be sequentially reflected by the second reflector member 220 and the third reflector member 230 again and incident on the lens unit 300. On the other hand, only a part of the second light (L2) that is not reflected by the first reflector member 210 may be reflected by the second reflector member 220 and the third reflector member 230 and incident on the lens unit 300. In the automotive lamp according to the present disclosure, however, since more light is reflected in the direction of the lens unit 300 than in the conventional lamp, a more uniform illumination image can be efficiently formed.

Hereinafter, an automotive lamp according to an exemplary embodiment of the present disclosure will be described in detail.

Figure 6A:
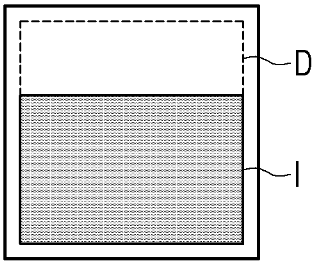
FIGS. 6A and 6B compare lighting images of a conventional lamp in the related art and an automotive lamp according to an exemplary embodiment of the present disclosure.
Figure 6B:
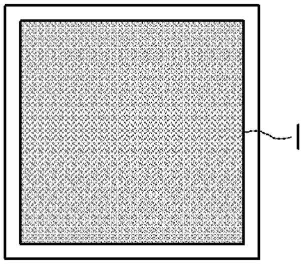
Related Art FIG. 6B
Figure 7:
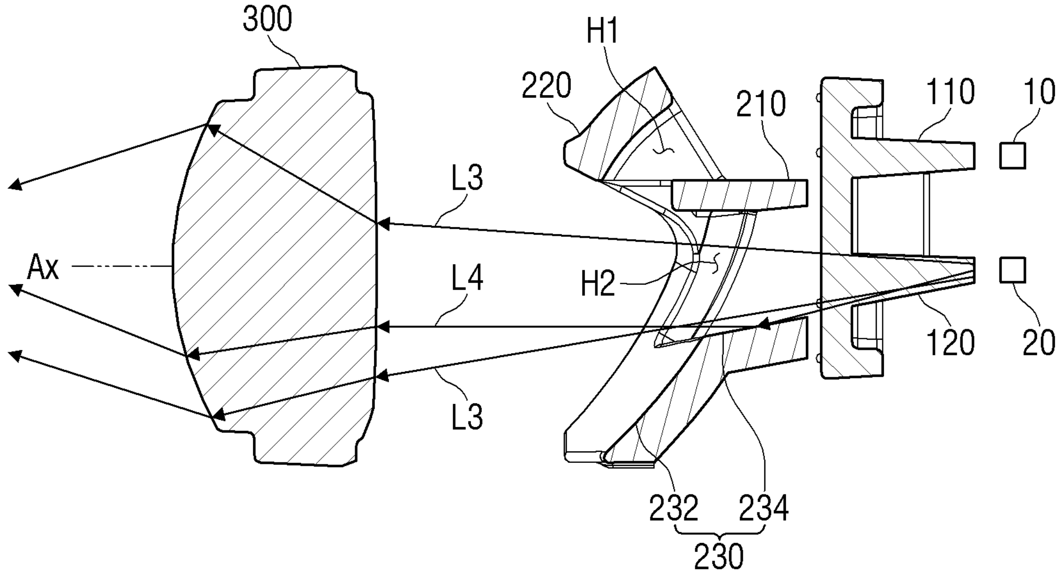
FIG. 7 shows a path of light generated from a second light source according to an exemplary embodiment of the present disclosure.
Figure 8A:
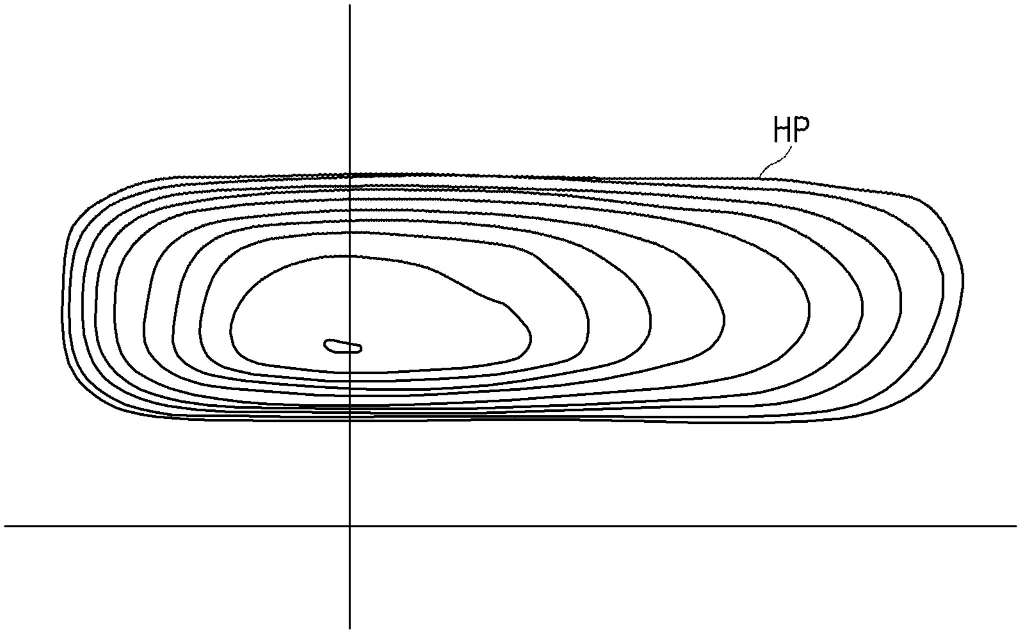
FIGS. 8A and 8B compare second beam patterns of a conventional lamp in the related art and an automotive lamp according to an exemplary embodiment of the present disclosure.
Figure 8B:
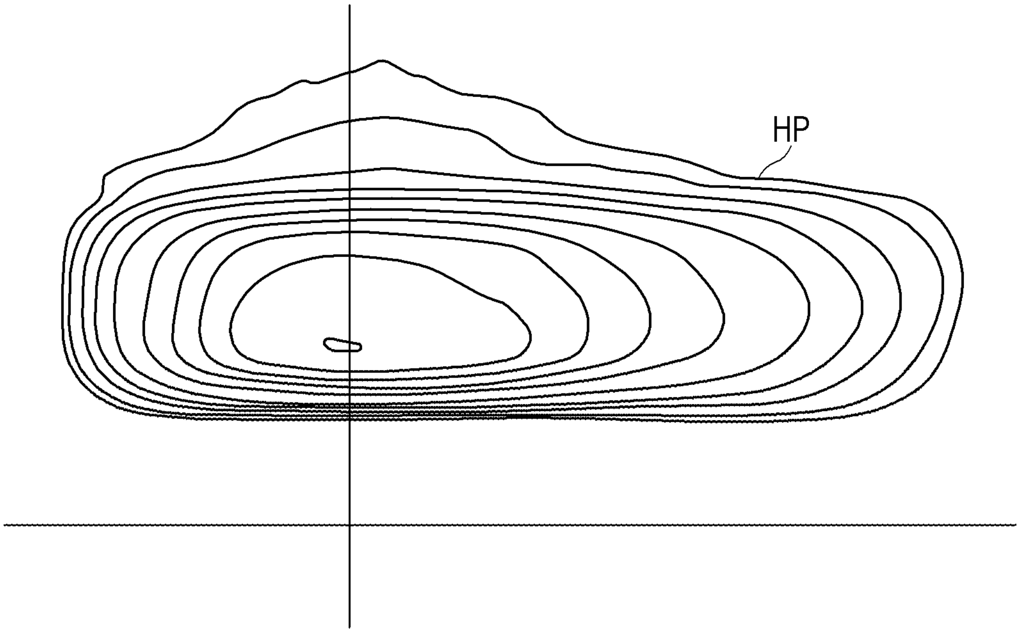
Related Art FIG. 8B
Figure 9:
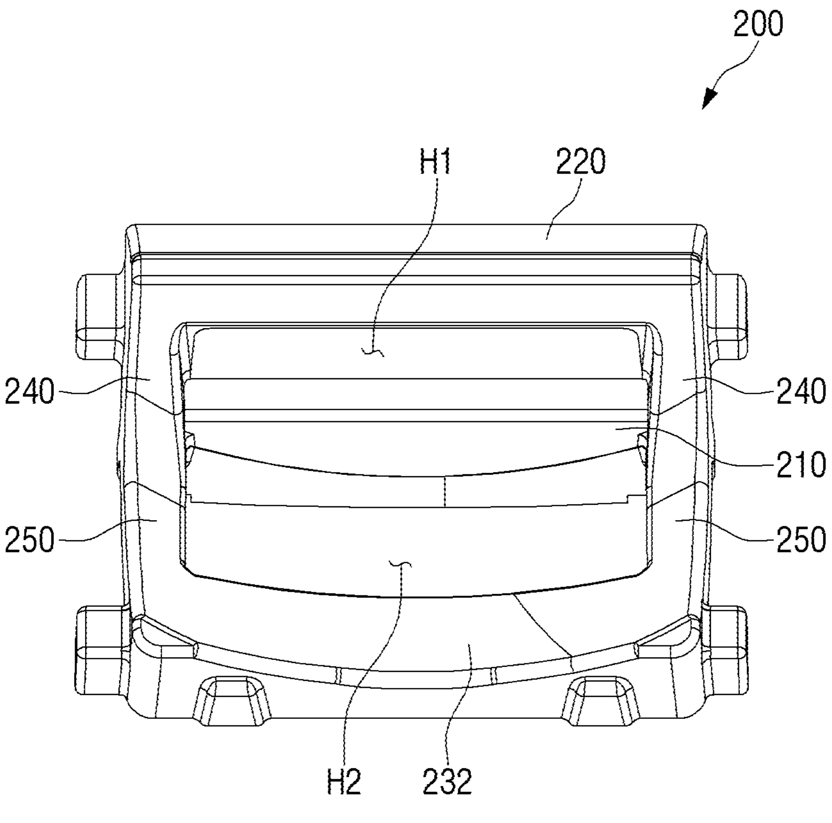
FIGS. 9 to 11 show a reflector unit of an automotive lamp according to an exemplary embodiment of the present disclosure.
Figure 10:
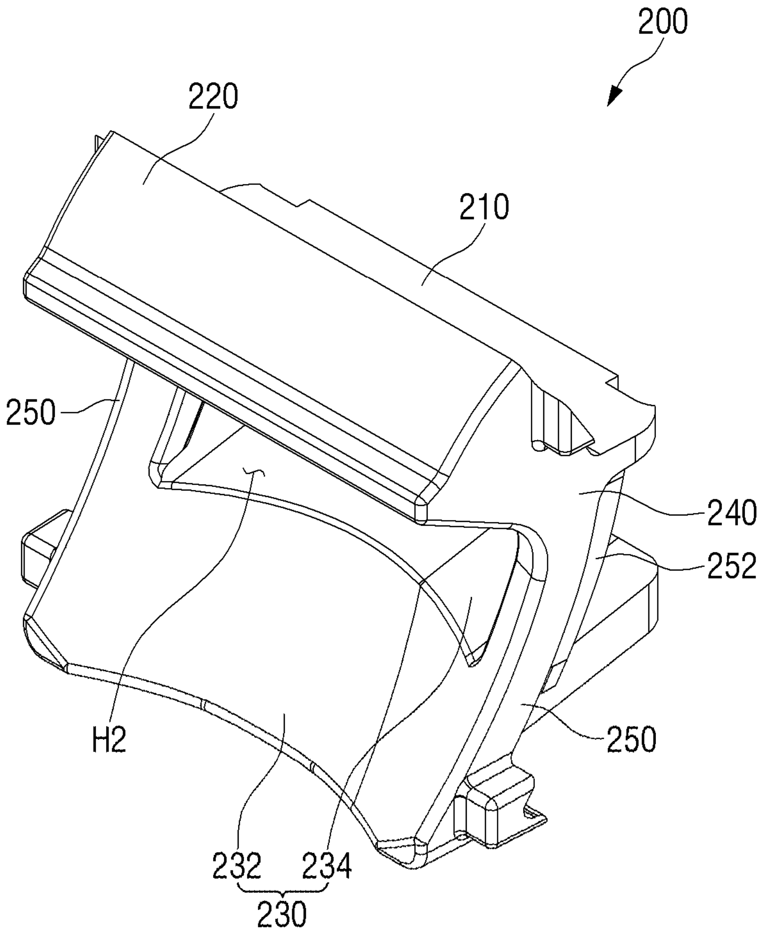
Figure 11:
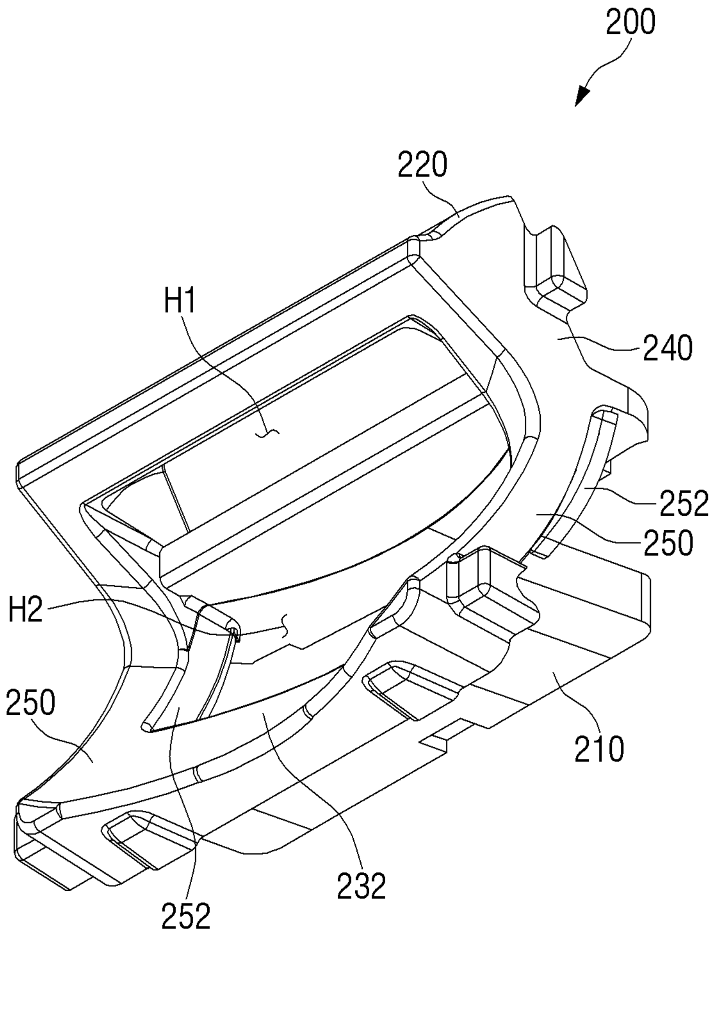

FIG. 5 shows a path of light generated from a first light source according to an exemplary embodiment of the present disclosure; FIGS. 6A and 6B show illuminations images of an automotive lamp according to an exemplary embodiment of the present disclosure; FIG. 7 shows a path of light generated from a second light source according to an exemplary embodiment of the present disclosure; FIGS. 8A and 8B show a second beam pattern of an automotive lamp according to an exemplary embodiment of the present disclosure; and FIGS. 9 to 11 show a reflector unit of an automotive lamp according to an exemplary embodiment of the present disclosure.

Referring to FIGS. 5 to 11, the third reflector member 230 according to an exemplary embodiment of the present disclosure may also include a front reflector part 232 and a rear reflector part 234.

The front reflector part 232 may reflect a part of the light reflected from the second reflector member 220 to the lens unit 300, and the rear reflector part 234 may reflect the light reflected to the rear of the front reflector part 232 among the light reflected by the second reflector member 220. In particular, the rear reflector part 234 may be disposed below the first reflector member 210, and the slope of the front reflector part 232 may be formed to be greater than the slope of the rear reflector part 234 with respect to the optical axis (Ax) of the lens unit 300. In other words, the angle formed by the optical axis (Ax) and the front reflector part 232 may be greater than the angle formed by the optical axis (Ax) and the rear reflector part 234. Further, the slope of the rear reflector part 234 may be formed to be greater than the slope of the first reflector member 210.

Therefore, after the first light (L1) and the second light (L2) are reflected from the second reflector member 220, they may be reflected from the front reflector part 232 or the rear reflector part 234. The light reflected from the front reflector part 232 may be incident on the lens unit 300. The light reflected from the rear reflector part 234 may be reflected from the light guide unit 100 or other parts of the reflector unit 200, and may be finally transmitted through the lens unit 300.

Accordingly, due to the rear reflector part 234 together with the above-described first reflector member 210, the automotive lamp according to the present disclosure may prevent light leakage more effectively compared to the conventional lamp in the related art, and thus an illumination image (I) may be formed without a shadow area (D), as shown in FIG. 6B. FIG. 6A is an illumination image (I) by a conventional lamp in the related art, and it shows that, due to the light leakage, a shadow area (D) is formed in the illumination image (I) as described above.

Specifically, the first light (L1) reflected from the rear reflector part 234 may be condensed on the light guide unit 100, or reflected again by the light guide unit 100 and may be delivered in the direction of the lens unit 300 to form a more uniform illumination image.

Further, as described above, the light generated from the second light source 20 may be guided forward through the second rod 120. Referring to FIG. 7, the third light (L3), which is a part of the light emitted from the light guide unit 100 through the second rod 120, may be incident on the lens unit 300 without being reflected by the reflector unit 200, and the fourth light (L4), which is a part of the light emitted from the light guide unit 100 through the second rod 120, may be reflected from the rear reflector part 234 and incident on the lens unit 300.

As such, the fourth light (L4) may be irradiated to the upper area of the second beam pattern by the rear reflector part 234. Accordingly, when light is generated from the second light source 20, the amount of light directed upward may be increased compared to the conventional lamp in the related art. Thus, as shown in FIG. 8B, the upper portion of the high beam pattern (HP), which is the first beam pattern, can be supplemented. FIG. 8A is a high beam pattern (HP) generated from a conventional lamp in the related art.

Referring to FIGS. 9 to 11, the reflector unit 200 according to an exemplary embodiment of the present disclosure may further include a first connection member 240 and a second connection member 250. The first connection member 240 may connect the first reflector member 210 and the second reflector member 220, and form the first through hole (H1), through which the first light (L1) and the second light (L2) may pass. Accordingly, the first light (L1) and the second light (L2) may pass through the first through hole (H1) and be reflected from the reflector unit 200 to be incident on the lens unit 300.

The second connection member 250 may connect the first reflector member 210 and the third reflector member 230, and form a second through hole (H2), through which the first light (L1) and the second light (L2) reflected from the second reflector member 220 and the third reflector member 230 may pass. Accordingly, the third light (L3) and the fourth light (L4) may be incident on the lens unit 300 as they pass through the second through hole (H2). The first connection member 240 and the second connection member 250 may be integrally formed.

Further, the second connection member 250 may include a protrusion 252 that protrudes in the direction toward the light guide unit 100. Therefore, as the third light (L3) or the fourth light (L4), which are not incident on the lens unit 300 and lost in the prior art, may be reflected from the protrusion 252 and delivered in the direction of the lens unit 300, thereby forming the second beam pattern more efficiently.

As described above, in the automotive lamp of the present disclosure, as light leakage may be prevented more effectively by the first reflector member 210, the rear reflector part 234, and the protrusion 252, compared to the prior art, the first and second beam pattern can be effectively formed and an uniform illumination image can be formed.

Figure 12:
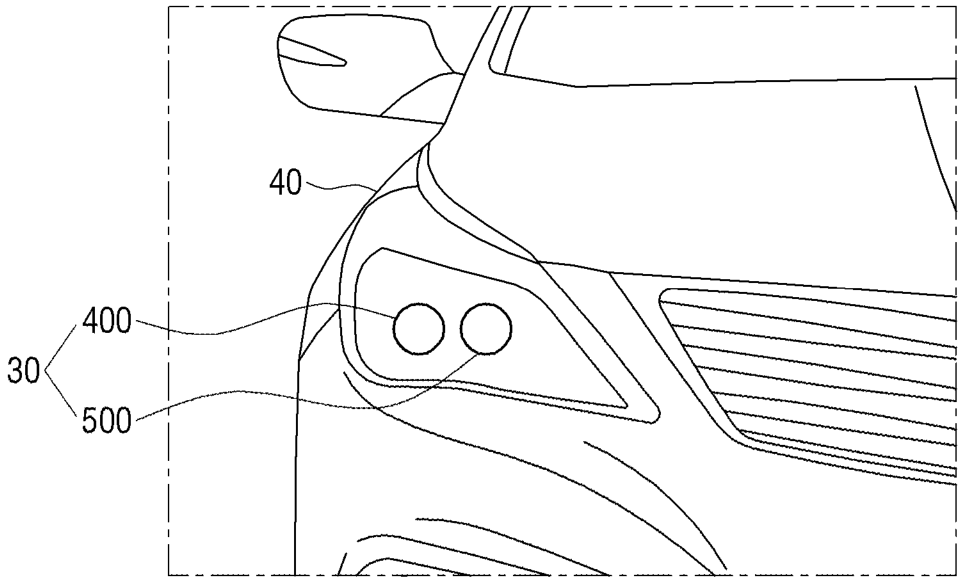
FIG. 12 shows an automotive lamp according to an exemplary embodiment of the present disclosure viewed from the front of the vehicle.
Figure 13:
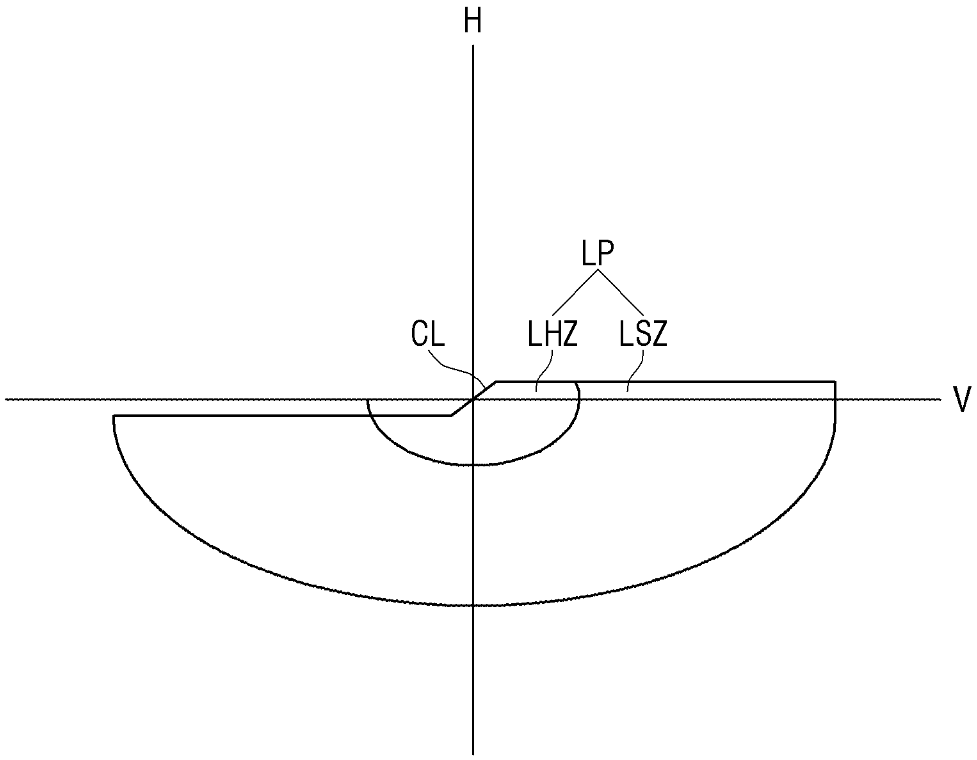
FIG. 13 shows a low beam pattern formed by an automotive lamp according to an exemplary embodiment of the present disclosure.
Figure 14:
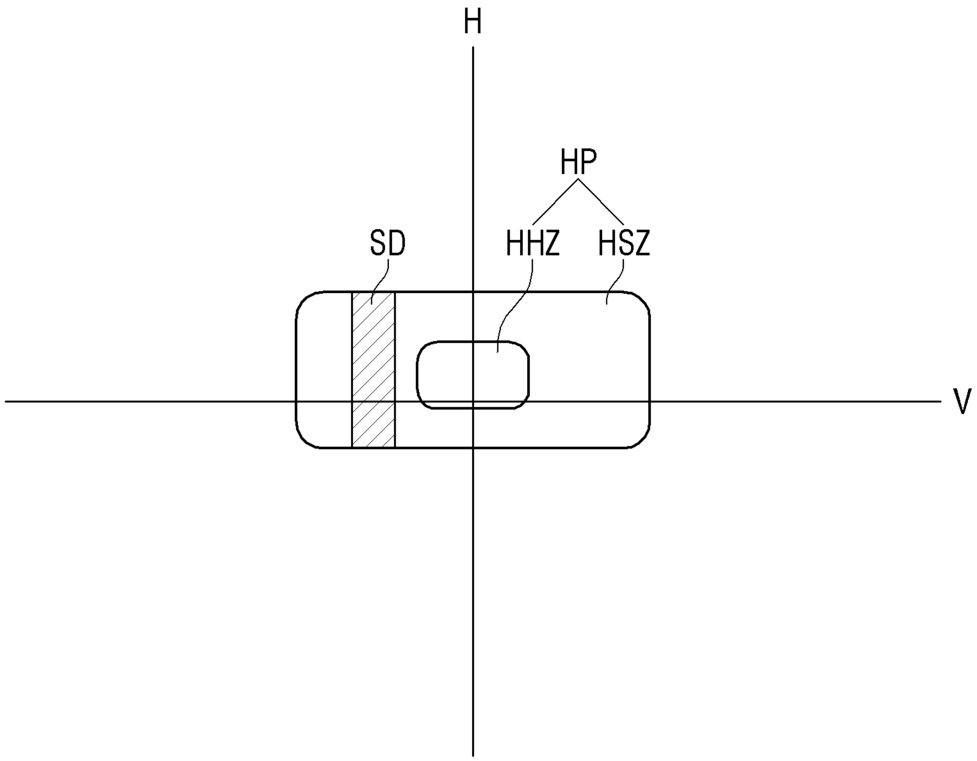
FIG. 14 shows a high beam pattern formed by an automotive lamp according to an exemplary embodiment of the present disclosure.
Figure 15:
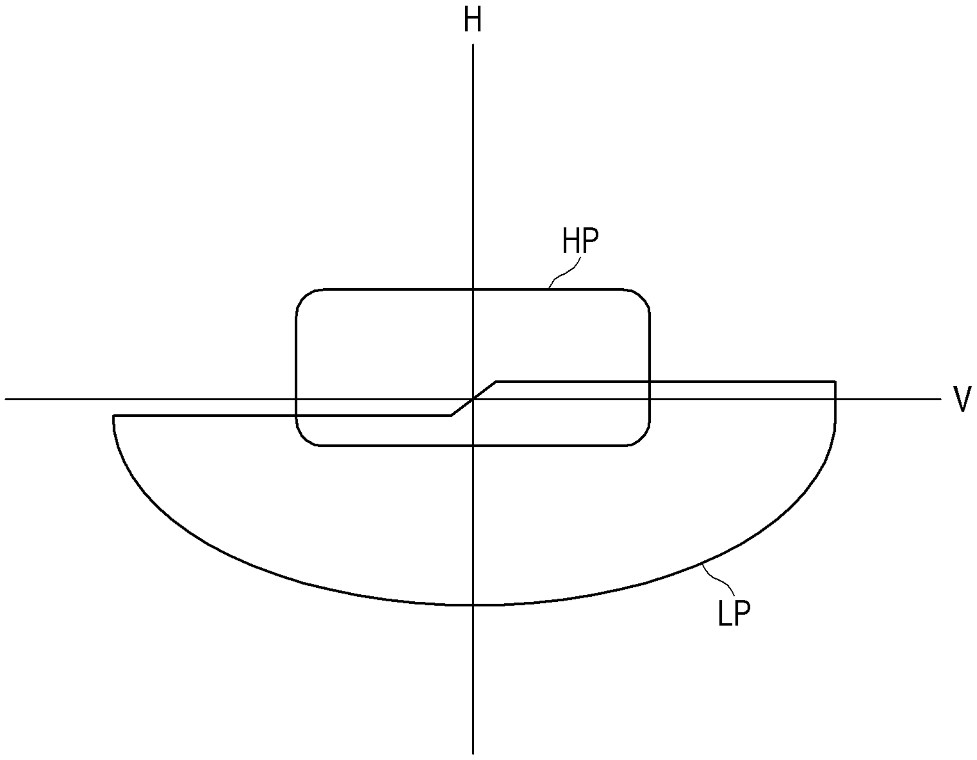
FIG. 15 shows a low beam pattern and a high beam pattern formed by an automotive lamp according to an exemplary embodiment of the present disclosure.
Figure 16:
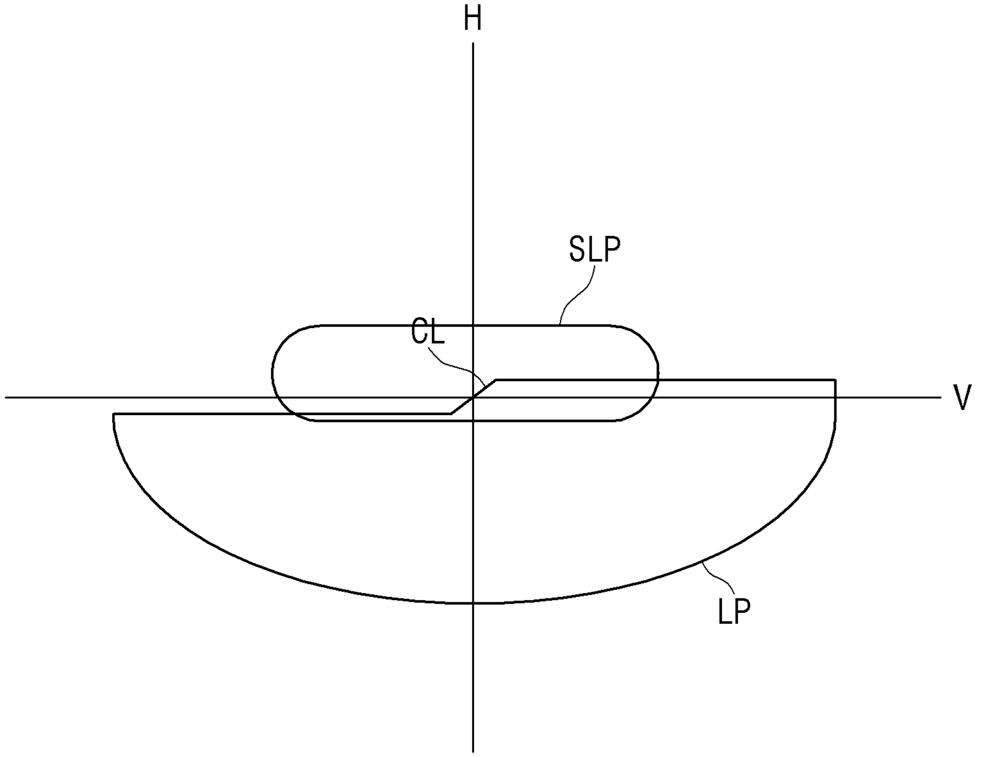
FIG. 16 shows a low beam pattern including a sub low beam pattern formed by an automotive lamp according to an exemplary embodiment of the present disclosure.
Figure 17:
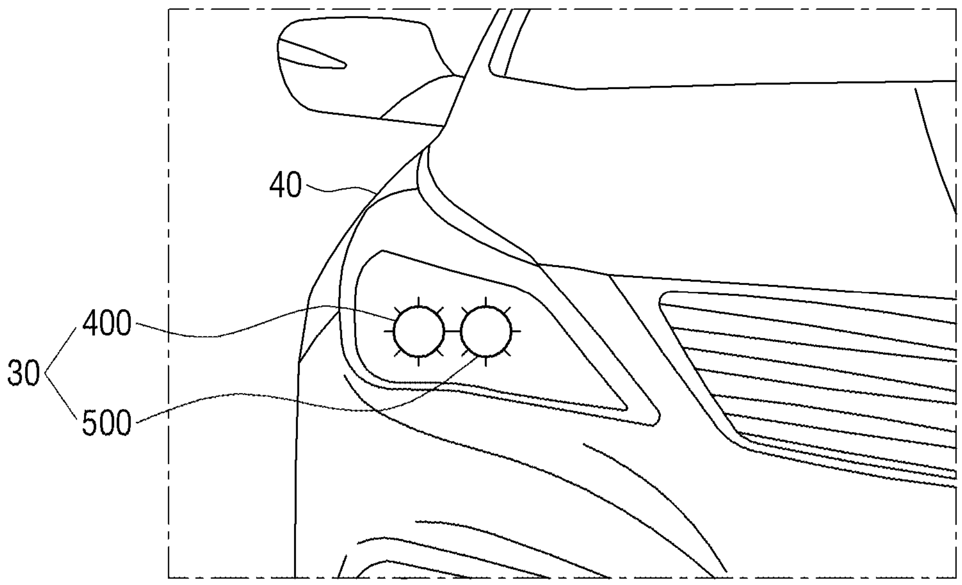
FIG. 17 describes an observed configuration of an automotive lamp according to an exemplary embodiment of the present disclosure.

FIG. 12 shows an automotive lamp viewed from the front of the vehicle; FIG. 13 shows a low beam pattern; FIG. 14 shows a high beam pattern; FIG. 15 shows a low beam pattern and a high beam pattern; FIG. 16 shows a low beam pattern including a sub low beam pattern; and FIG. 17 is a view for describing an observation form of an automotive lamp.

Referring to FIG. 12, an automotive lamp 30 according to an exemplary embodiment of the present disclosure may include a low beam lamp 400 and a high beam lamp 500. In the exemplary embodiment of the present disclosure, the automotive lamps 30 may be installed on both sides of the front of the vehicle 40 to secure a front view when the vehicle 40 is operated in a low-light condition such as at night or in a tunnel. Accordingly, a case where the automotive lamp 30 is used as a head lamp will be mainly described. However, this is merely an example for helping understanding of the present disclosure. The automotive lamp 30 of the present disclosure is not limited to a head lamp, and it may be used for the purpose of various lamps installed in the vehicle 40, such as a fog lamp, a tail lamp, a brake lamp, a turn signal lamp, a position lamp, and a daytime running lamp.

The automotive lamp 30 may form a low beam pattern (LP) for securing a near field view in front of the vehicle, and a high beam pattern for securing a far field view in front of the vehicle. In forming the high beam pattern, when other vehicle such as an on-coming vehicle or a preceding vehicle exists, the automotive lamp 30 may prevent light from being irradiated to an area corresponding to the location of the other vehicle, or reduce the amount of irradiated light, to form a shadow area. As the shadow area is formed, glare to the driver of the other vehicle can be prevented. The low beam lamp 400 may irradiate light to form a low beam pattern (LP), and the high beam lamp 500 may irradiate light to form a high beam pattern. The low beam lamp 400 and the high beam lamp 500 may be arranged adjacent to each other.

Referring to FIG. 13, the low beam pattern (LP) may include a cut-off line (CL). The cut-off line (CL) may be an inclined line crossing the center of the beam pattern formation surface. The left and right sides of the low beam pattern (LP) may have different heights based on the cut-off line (CL).

The low beam pattern (LP) may further include a concentrated light area (LHZ) and a diffused light area (LSZ). The concentrated light area (LHZ) may refer to a beam pattern formed by concentrating light, and the diffused light area (LSZ) may refer to a beam pattern formed by diffusing light at the edge of the concentrated light area (LHZ). Accordingly, the concentrated light area (LHZ) may exhibit higher brightness than the diffused light area (LSZ). The concentrated light area (LHZ) may be a beam pattern irradiated to a near-front area where the driver's interest is concentrated, and the near-field view of the vehicle 40 may be more easily secured by the concentrated light area (LHZ).

Referring to FIG. 14, the high beam pattern (HP) may include a concentrated light area (HHZ) and a diffused light area (HSZ). The concentrated light area (HHZ) may refer to a beam pattern formed by concentrating light, and the diffused light area (HSZ) may refer to a beam pattern formed by diffusing light at the edge of the concentrated light area (HHZ). Accordingly, the concentrated light area (HHZ) may exhibit higher brightness than the diffused light area (HSZ). The concentrated light area (HHZ) may be a beam pattern that is irradiated to a distant-front area where the driver's interest is concentrated, and a far field of front view of the vehicle 40 may be more easily secured by the concentrated light area (HHZ).

The high beam pattern (HP) may selectively include a shadow area (SD). The shadow area (SD) may represent an area, to which no or less light is irradiated. For example, when there is a vehicle in front, the high beam pattern (HP) may include a shadow area (SD) so that no light is irradiated to the corresponding area. The location of the shadow area (SD) may be changed within the entire area of the high beam pattern (HP), and the number of the shadow area (SD) may be changed.

Referring to FIG. 15, the low beam pattern (LP) and the high beam pattern (HP) may be formed at the same time. When the low beam pattern (LP) and the high beam pattern (HP) are simultaneously formed, an overlapping area, in which at least a part of each of the low beam pattern (LP) and the high beam pattern (HP) overlap, may be formed. Alternatively, according to some exemplary embodiments of the present disclosure, the low beam pattern (LP) and the high beam pattern (HP) may include no overlapping area therebetween. For example, the high beam pattern (HP) may be formed to correspond to the boundary of the low beam pattern (LP).

The automotive lamp 30 according to the exemplary embodiment of the present disclosure may form only the low beam pattern (LP) as shown in FIG. 13 or the high beam pattern (HP) together with the low beam pattern (LP) at the same time as shown in FIG. 15. On the other hand, when only the low beam lamp 400 is turned on and the high beam lamp 500 is turned off in order to form only the low beam pattern (LP), the visibility by a pedestrian or a driver of other vehicle may be reduced, and undesirable aesthetics may be obtained.

In order to overcome such short-comings, the automotive lamp 30 according to the exemplary embodiment of the present disclosure may turn on the high beam lamp 500 even when the high beam pattern (HP) is not formed. In this case, since both the low beam lamp 400 and the high beam lamp

500 are turned on at the same time, the visibility of the vehicle 40 can be improved and more desirable aesthetics can be provided.

Referring to FIG. 16, a sub low beam pattern (SLP) may be formed in an upper portion of the low beam pattern (LP). The low beam pattern (LP) may be formed by the low beam lamp 400, and the sub low beam pattern (SLP) may be formed by the high beam lamp 500. More specifically, when the high beam pattern (HP) is not formed, the high beam lamp 500 may be utilized to form the sub low beam pattern (SLP).

The sub low beam pattern (SLP) may be formed in an upper portion of the low beam pattern (LP). Specifically, the sub low beam pattern (SLP) may be disposed in the upper portion of the cut-off line (CL). Accordingly, the sub low beam pattern (SLP) may improve the near field of front view of the vehicle 40 and improve the visibility of pedestrians. However, according to some exemplary embodiments of the present disclosure, the sub low beam pattern (SLP) may be disposed within the area of the low beam pattern (LP), or may partially or completely deviate from the boundary of the low beam pattern (LP).

Referring to FIG. 17, the low beam lamp 400 and the high beam lamp 500 may be turned on at the same time. When only the low beam lamp 400 is turned on, and the high beam lamp 500 is not turned on, the visibility of the vehicle 40 is reduced, and undesirable aesthetics may be provided. Conversely, when the low beam lamp 400 and the high beam lamp 500 are simultaneously turned on, the visibility of the vehicle 40 can be improved and the desirable aesthetics can be achieved.

Figure 18:
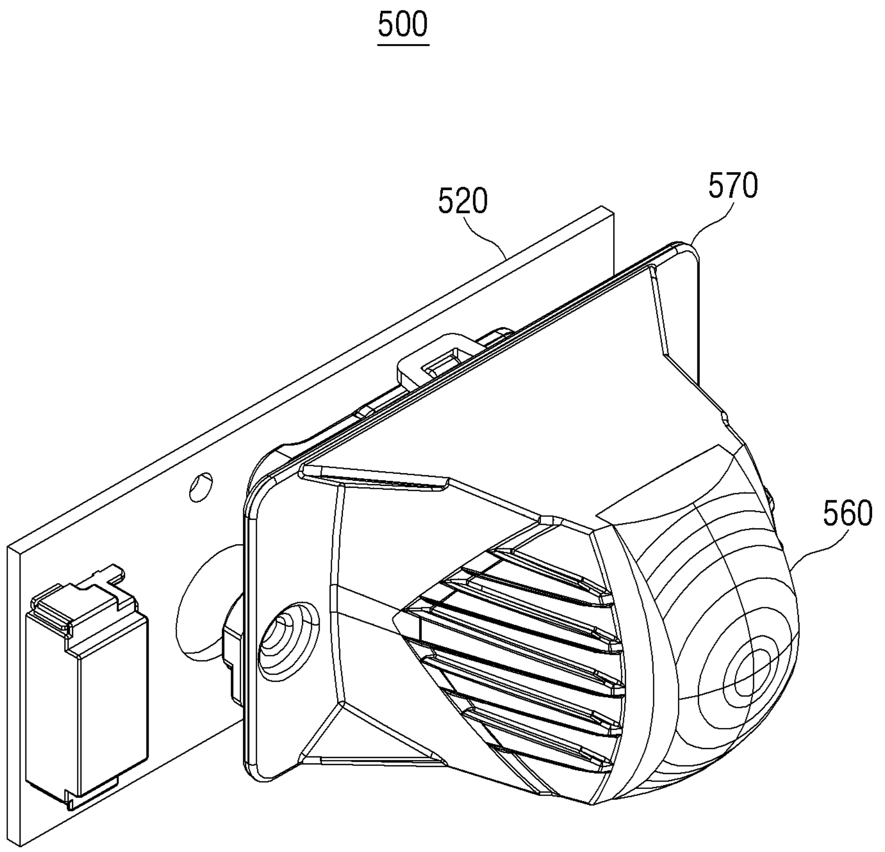
FIG. 18 is a perspective view of a high beam lamp in an automotive lamp according to an exemplary embodiment of the present disclosure.
Figure 19:
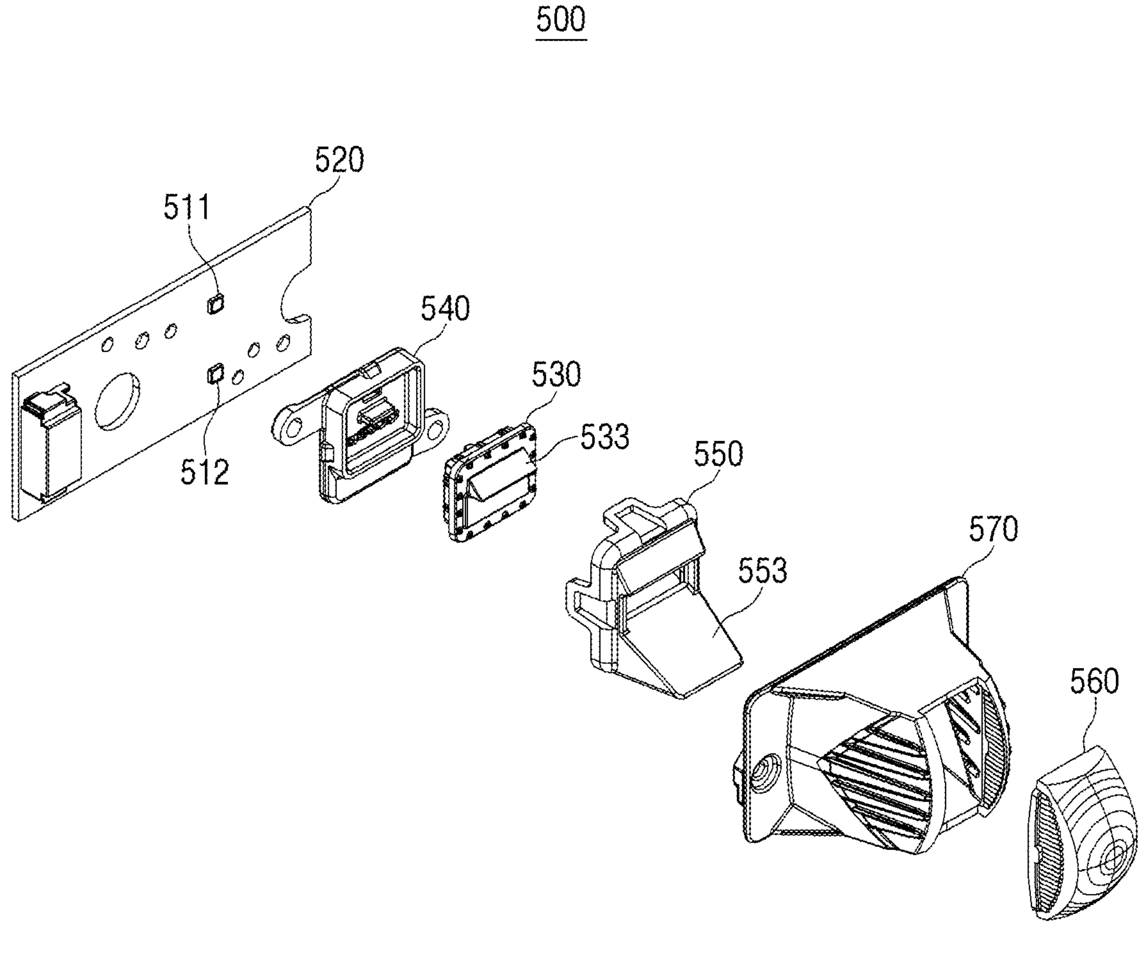
FIG. 19 is an exploded perspective view of a high beam lamp in an automotive lamp according to an exemplary embodiment of the present disclosure.

FIG. 18 is a perspective view of a high beam lamp, and FIG. 19 is an exploded perspective view of a high beam lamp. Referring to FIGS. 18 and 19, the high beam lamp 500 may include a first light source 511, a second light source 512, a substrate 520, a first lens 530, a base bracket 540, a lens bracket 550, a second lens 560, and a lens holder 570.

The light sources 511 and 512 may irradiate light. The light sources 511 and 512 may be light emitting modules that generate light, and may be one of a light emitting diode (LED), a laser, or a bulb type light source. The light sources 511 and 512 may irradiate light having a certain angular range, and for this purpose, a separate lens (not shown) for concentrating or diffusing the light may be provided on the light irradiation path of the light sources 511 and 512. The light sources 511 and 512 may include a first light source 511 and a second light source 512. The light from the first light source 511 may be used to form a first beam pattern, and the light from the second light source 512 may be used to form a second beam pattern. Here, the first beam pattern may include a sub low beam pattern, and the second beam pattern may include a high beam pattern. Hereinafter, the light irradiated by the first light source 511 is referred to as a first light, and the light irradiated by the second light source 512 is referred to as a second light.

The substrate 520 may support the light sources 511 and 512. The light sources 511 and 512 may be arranged on the substrate 520, and one surface of the light sources 511 and 512 may be arranged in close contact with the substrate 520. The substrate 520 may receive electrical power from outside and deliver it to the light sources 511 and 512. The light sources 511 and 512 may generate and irradiate light due to the electrical power delivered from the substrate 520.

The first lens 530 may reflect the first light to form the first reflected light. To this end, the first lens 530 may include a first reflector 533. The first light may be reflected by the first reflector 533 to form first reflected light.

The base bracket 540 may support the first lens 530 with respect to the substrate 520. The first lens 530 may be supported by the base bracket 540 to allow a position with respect to the substrate 520 to be fixed. For example, the base bracket 540 may be coupled to the substrate 520 by a fastening means such as a bolt, and the first lens 530 may be accommodated in an accommodation space formed in the base bracket 540.

The lens bracket 550 may fix the first lens 530 to the first light source 511 and the second light source 512. When the first lens 530 is accommodated in the base bracket 540 coupled to the substrate 520, as the lens bracket 550 presses the first lens 530, the first lens 530 may be fixed to the light sources 511 and 512. As their positions are fixed by the base bracket 540 and the lens bracket 550, the points where the light of the first light source 511 and the second light source 512 is incident on the first lens 530 may be constantly maintained.

The lens bracket 550 may include a second reflector 553. The second reflector 553 may reflect the first reflected light to form second reflected light. The first reflected light emitted from the first reflector 533 of the first lens 530 may be reflected by the second reflector 553 to form the second reflected light.

The second lens 560 may transmit the second reflected light to form a first beam pattern, e.g., a sub row beam pattern. In the present disclosure, the second lens 560 may be implemented as an aspherical lens. The second reflected light emitted from the second reflector 553 of the lens bracket 550 may be transmitted through the second lens 560 to form a sub low beam pattern. Further, the second lens 560 may transmit the second light delivered from the first lens 530 to form a high beam pattern. The second light from the second light source 512 may be directly transmitted through the first lens 530 and the second lens 560 without being reflected. The light that is sequentially transmitted through the first lens 530 and the second lens 560 may be used to form a high beam pattern.

The lens holder 570 may support the second lens 560. Further, the lens holder 570 may prevent the light emitted from the first lens 530 from being exposed to the outside. To this end, the lens holder 570 may include an accommodation space for accommodating at least one of the first lens 530, the base bracket 540, and the lens bracket 550. Among the light emitted from the first lens 530, the light that has not reached the second lens 560 may be prevented from leaking to the outside by the lens holder 570.

Figure 20:
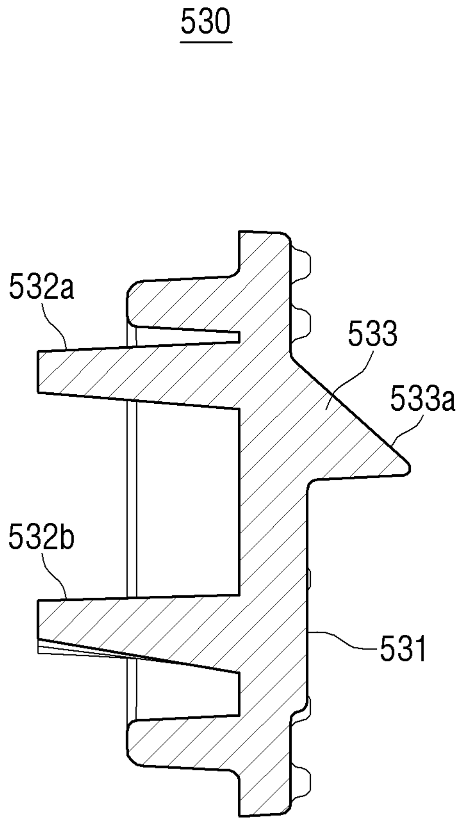
FIG. 20 is a side cross-sectional view of the first lens of an automotive lamp according to an exemplary embodiment of the present disclosure.

FIG. 20 is a side cross-sectional view of the first lens. Referring to FIG. 20, the first lens 530 may include a lens body 531, a first guide rod 532*a*, a second guide rod 532*b*, and a first reflector 533.

In the present disclosure, the first lens 530 may be made of a silicone material. The first lens 530, in which the lens body 531, the first guide rod 532*a*, the second guide rod 532*b*, and the first reflector 533 are integrally formed, may be manufactured by processing silicone.

The lens body 531 may be provided in a substantially parallel plate shape. The first guide rod 532*a*, the second guide rod 532*b*, and the first reflector 533 may be formed to protrude outward from major surfaces of the lens body 531. The first guide rod 532*a* and the second guide rod 532*b* may protrude from the lens body 531 toward the first light source 511 and the second light source 512, respectively, and the first reflector 533 may protrude from the lens body 531 in a different direction (e.g., in an opposite direction) from the first guide rod 532*a* and the second guide rod 532*b*.

The first guide rod 532*a* may guide the first light to the first reflector 533. The light incident on the first guide rod 532*a* may be reflected on the inner surfaces of the first guide rod 532*a* and guided to the first reflector 533. The second guide rod 532*b* may guide the second light to the lens body 531. The light incident on the second guide rod 532*b* may be reflected on the inner surfaces of the second guide rod 532*b* and guided to the lens body 531.

The first reflector 533 may reflect the first light guided by the first guide rod 532*a*. The first light incident into the first lens 530 through the first guide rod 532*a* may be reflected on the reflective surface 533*a* of the first reflector 533 and emitted to the outside of the first lens 530. The first reflector 533 may be provided in the shape of a triangular pillar. The first light may be incident through the first surface and reflected through the second surface to form the first reflected light, and the first reflected light may be emitted through the third surface. The arrangement angle of the reflective surface 533*a* of the first reflector 533 may be determined to allow the light reflectance to be higher than the light transmittance.

Figure 21:
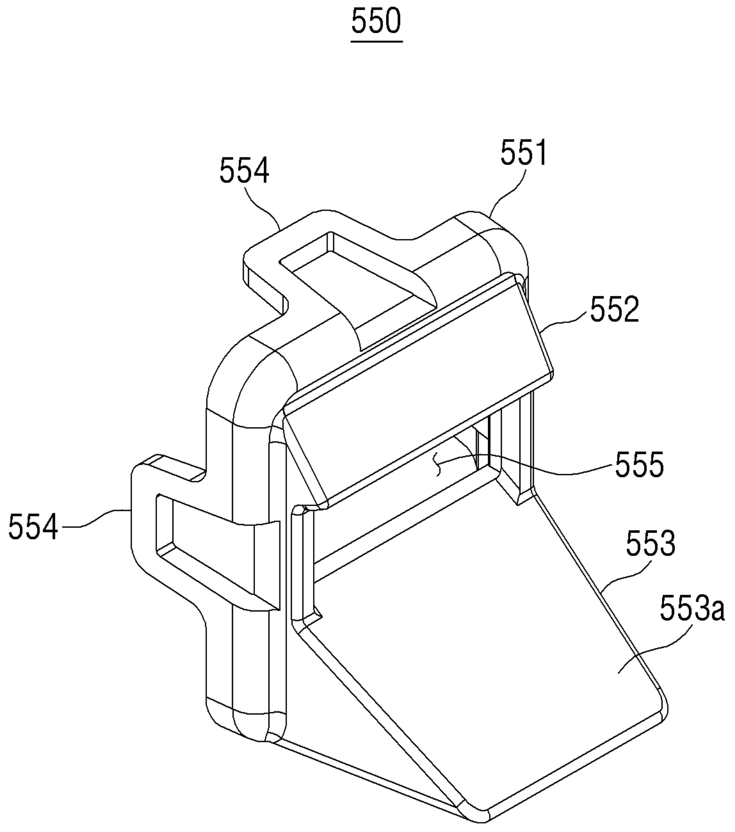
FIG. 21 is a perspective view of a lens bracket of an automotive lamp according to an exemplary embodiment of the present disclosure.
Figure 22:
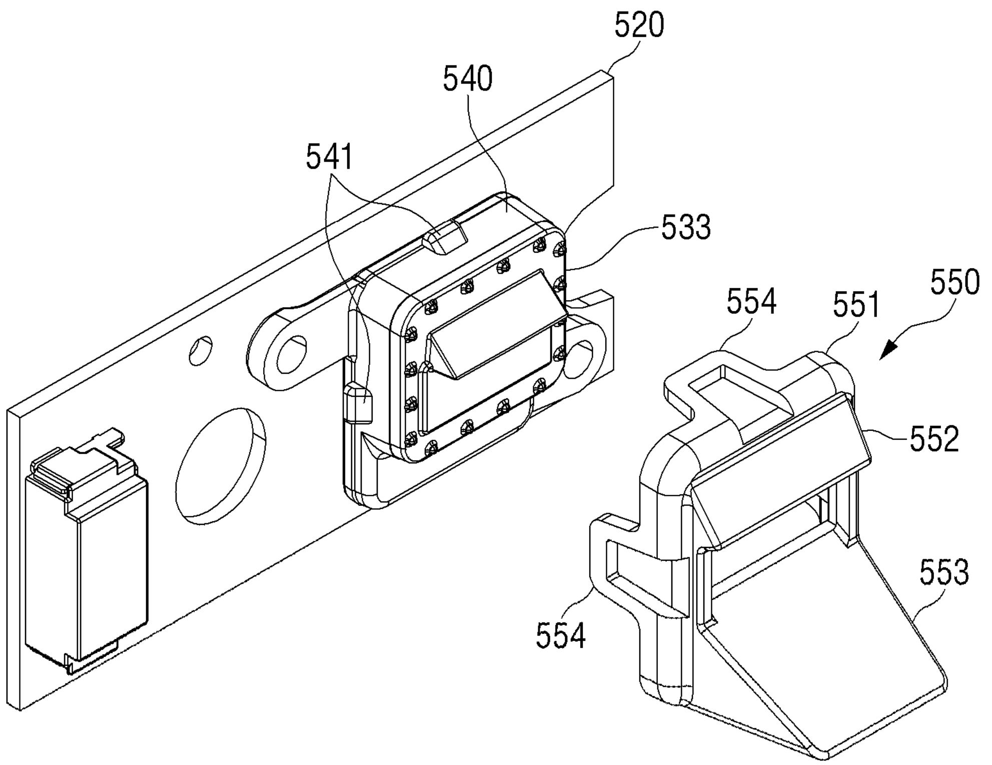
FIG. 22 describes the coupling relationship between the base bracket and the lens bracket in an automotive lamp according to an exemplary embodiment of the present disclosure.
Figure 23:
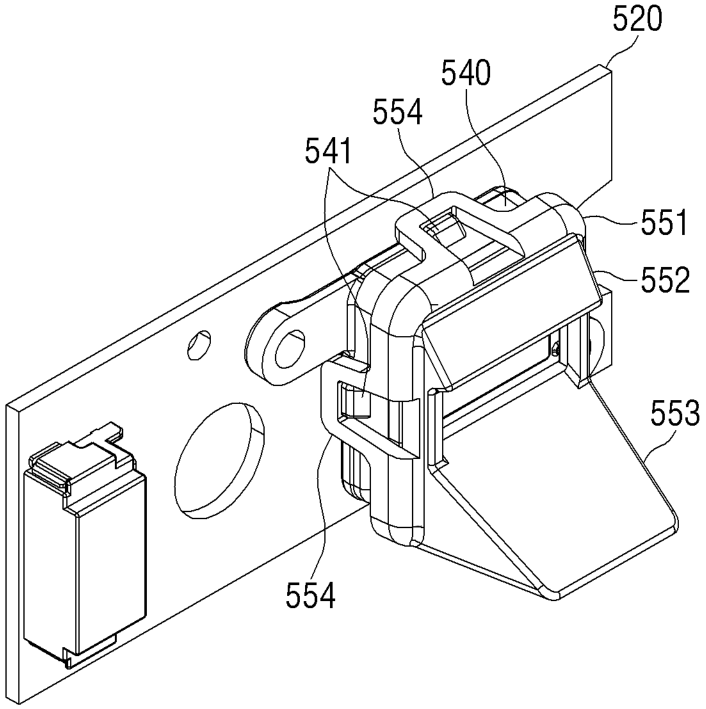
FIG. 23 shows the lens bracket coupled to the base bracket in an automotive lamp according to an exemplary embodiment of the present disclosure.

FIG. 21 shows a perspective view of a lens bracket, FIG. 22 describes the coupling relationship between the base bracket and the lens bracket, FIG. 23 shows the lens bracket coupled to the base bracket, and FIG. 24 shows a reflective surface of a second reflector. Referring to FIG. 21, the lens bracket 550 may include a bracket body 551, a cover unit 552, and a second reflector 553.

The bracket body 551 may surround the first lens 530. Further, the bracket body 551 may be coupled to the base bracket 540. Referring to FIGS. 22 and 23, the bracket body 551 may be coupled to the base bracket 540 via a locking unit 554 provided on the bracket body 551 configured to be engaged with a locking protrusion 541 provided on the base bracket 540. As the lens bracket 550 is coupled to the base bracket 540, the position of the first lens 530 provided between the lens bracket 550 and the base bracket 540 may be fixed.

Referring back to FIG. 21, the cover unit 552 may cover the reflective surface 533*a* of the first reflector 533. As described above, the first lens 530 may be made of a silicone material. Accordingly, a part of the first light that has flowed into the first reflector 533 of the first lens 530 may not be reflected from the reflective surface 533*a* of the first reflector 533, but may be transmitted through the reflective surface 533*a*. As the cover unit 552 covers the reflective surface 533*a*, the light transmitted through the reflective surface 533*a* may be prevented from being directly delivered to the second lens 560. Further, the cover unit 552 may reflect the light transmitted through the reflective surface 533*a*. The light reflected by the cover unit 552 may be delivered to the second reflector 553.

The second reflector 553 may reflect the first reflected light emitted from the first reflector 533 of the first lens 530 to form the second reflected light. The second reflected light may be irradiated to the second lens 560. In the present disclosure, the lens bracket 550 may be made of a resin material or a metal material. For example, the lens bracket 550 may be made of an acrylic material or a stainless material. The second reflector 553 may reflect the first reflected light via the reflective surface 553*a*, which is a reflective surface, to form the second reflected light.

Alternatively, the second reflector 553 may include a reflective layer formed by applying a reflective material. For example, a white paint may be applied to the reflective surface 553*a* of the second reflector 553 to form a reflective layer. The reflective layer may reflect most of the incident first reflected light, and may absorb only a part of it.

Figure 24A:
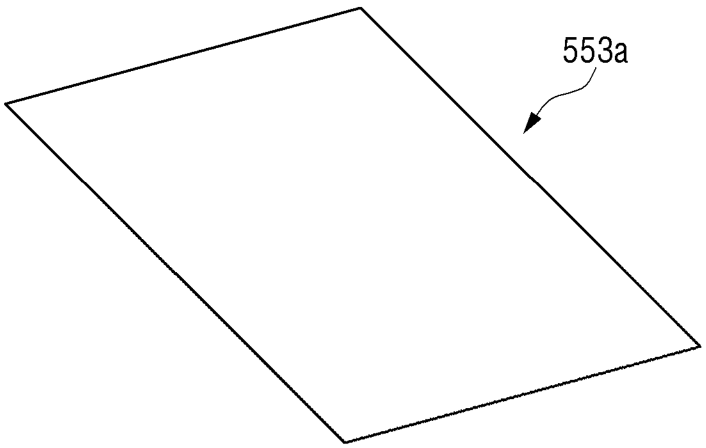
FIGS. 24A and 24B show a reflective surface of a second reflector in an automotive lamp according to an exemplary embodiment of the present disclosure.
Figure 24B:
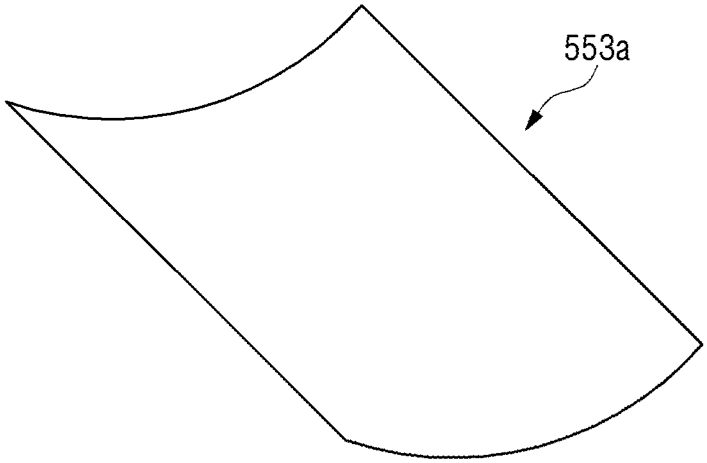

Referring to FIGS. 24A and 24B, the reflective surface 553*a* of the second reflector 553 may be a flat surface (FIG. 24A) or a curved surface (FIG. 24B). When the reflective surface 553*a* is implemented as a curved surface, it may be provided in a form, in which the center portion is recessed inward. The geometry of the second reflected light incident on the second lens 560 may be determined based on the shape of the reflective surface 553*a*. For example, the second reflected light emitted from the reflective surface 553*a* of the second reflector 553 may be concentrated to a specific area of the second lens 560 or uniformly incident over the entire area of the second lens 560 depending on the shape of the reflective surface 553*a*.

Referring back to FIG. 21, the bracket body 551 may include a through hole 555. The through hole 555 may be formed by perforating the bracket body 551. The through hole 555 may be formed between the cover unit 552 and the second reflector 553, but the location of the through hole 555 of the present disclosure is not limited to between the cover unit 552 and the second reflector 553. The through hole 555 may transmit the second light generated by the second light source 512. The second light may be incident on the second lens 560 after sequentially being transmitted through the first lens 530 and the through hole 555.

Figure 25:
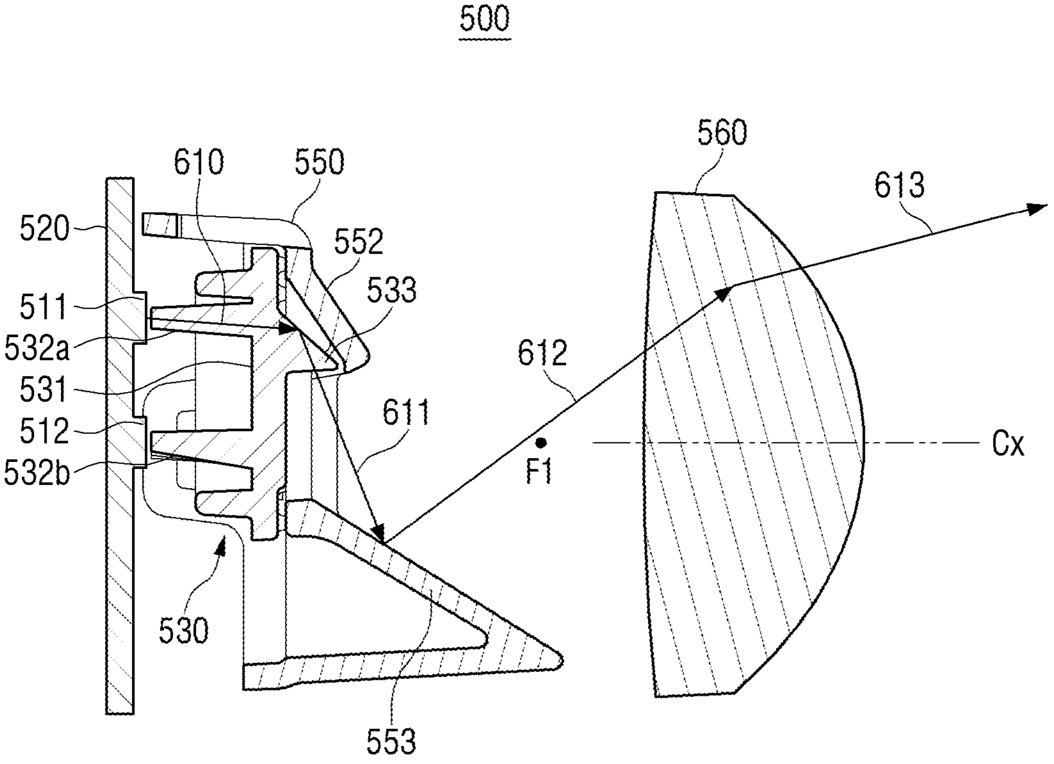
FIG. 25 illustrates the light path that forms a sub low beam pattern in an automotive lamp according to an exemplary embodiment of the present disclosure.

FIG. 25 illustrates the light that is irradiated to form a sub low beam pattern. Referring to FIG. 25, the light for forming a sub low beam pattern (SLP) may be irradiated through the high beam lamp 500.

The first light 610 irradiated from the first light source 511 may be guided to the first reflector 533 by the first guide rod 532*a* of the first lens 530. The first reflector 533 may reflect the first light 610 to form the first reflected light 611. Specifically, the first reflector 533 may reflect the first light 610 incident in the horizontal direction in a downwardly inclined direction to form the first reflected light 611. A part of the first light 610 incident on the first reflector 533 may not be reflected by the first reflector 533 and may be transmitted through the first reflector 533. The light transmitted through the first reflector 533 may be blocked from being directly delivered to the second lens 560 by the cover unit 552 of the lens bracket 550. When the first light 610 is directly delivered to the second lens 560, a concentrated light area by the corresponding light may be included in the sub low beam pattern (SLP). However, as the first light 610 is blocked from being directly delivered to the second lens 560 by the cover unit 552, the concentrated light area may be prevented from being formed in the sub low beam pattern (SLP).

The second reflector 553 may reflect the first reflected light 611 to form the second reflected light 612. Specifically, the second reflector 553 may reflect the first reflected light 611 in an upwardly inclined direction to form the second reflected light 612. The second reflected light 612 emitted from the second reflector 553 may pass through a point that is disposed higher than the focal point (F1) of the second lens 560 and be incident on the second lens 560. Accordingly, the second reflected light 612 incident on the second lens 560 may be refracted by the second lens 560 to form a sub low beam light 613 that is inclined with respect to the optical axis (Cx) of the second lens 560. Further, the sub low beam light 613 may form a sub low beam pattern (SLP) that is mapped to an area higher than the low beam pattern (LP).

Figure 26:
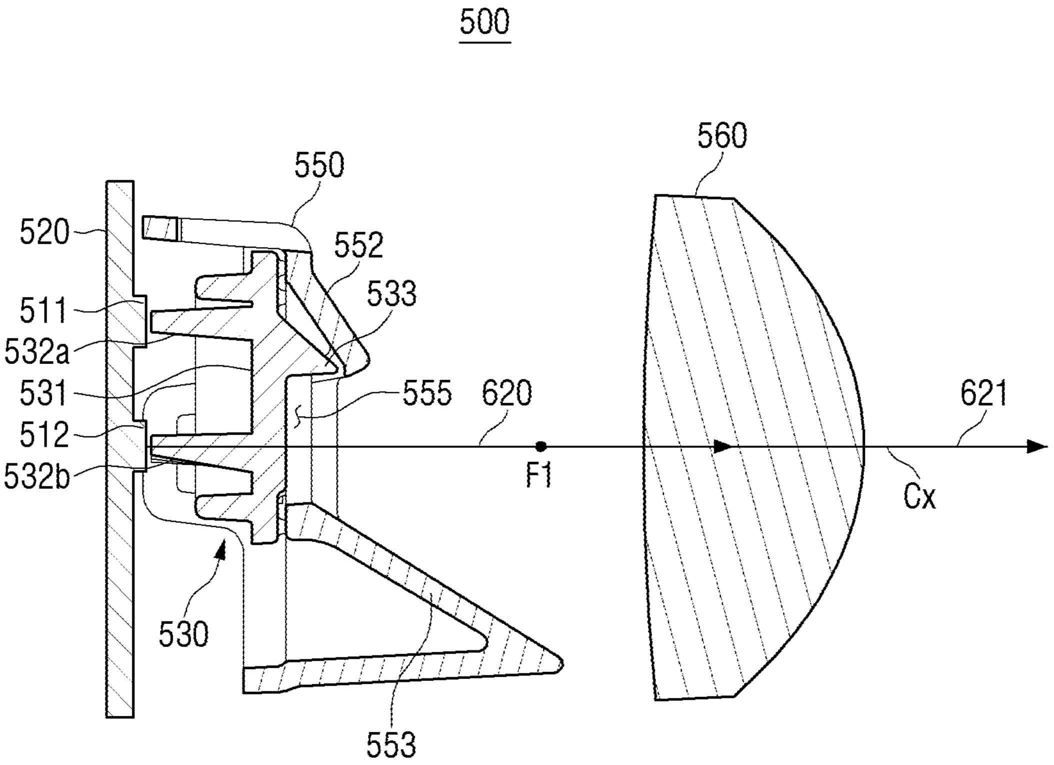
FIG. 26 illustrates the light path that forms a high beam pattern in an automotive lamp according to an exemplary embodiment of the present disclosure.

FIG. 26 shows the light that is irradiated to form a high beam pattern. Referring to FIG. 26, the light for forming a high beam pattern may be irradiated through the high beam lamp 500.

The second light 620 irradiated from the second light source 512 may be guided to the lens body 531 by the second guide rod 532*b* of the second lens 560. The lens body 531 may transmit the second light 620. For example, the lens body 531 may transmit the second light 620 without causing any physical change to the second light 620. The second light 620 transmitted through the lens body 531 may pass through the through hole 555 of the lens bracket 550 and be incident on the second lens 560. The second light 620 may pass through the focal point (F1) of the second lens 560 and be incident on the second lens 560, and the second light 620 incident on the second lens 560 may form the high beam light 621 by being transmitted generally parallel to the optical axis (Cx) of the second lens 560. The high beam light 621 may form the above-described high beam pattern (HP).

Figure 27:
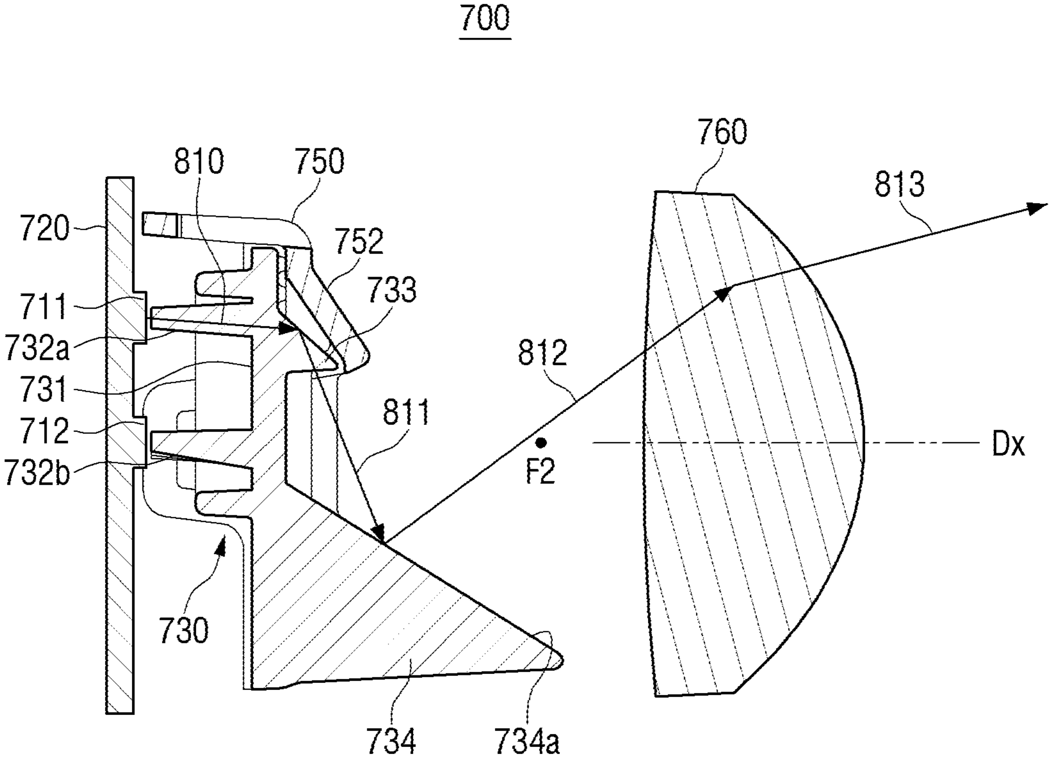
FIG. 27 illustrates a high beam lamp according to another exemplary embodiment of the present disclosure.
Figure 28:
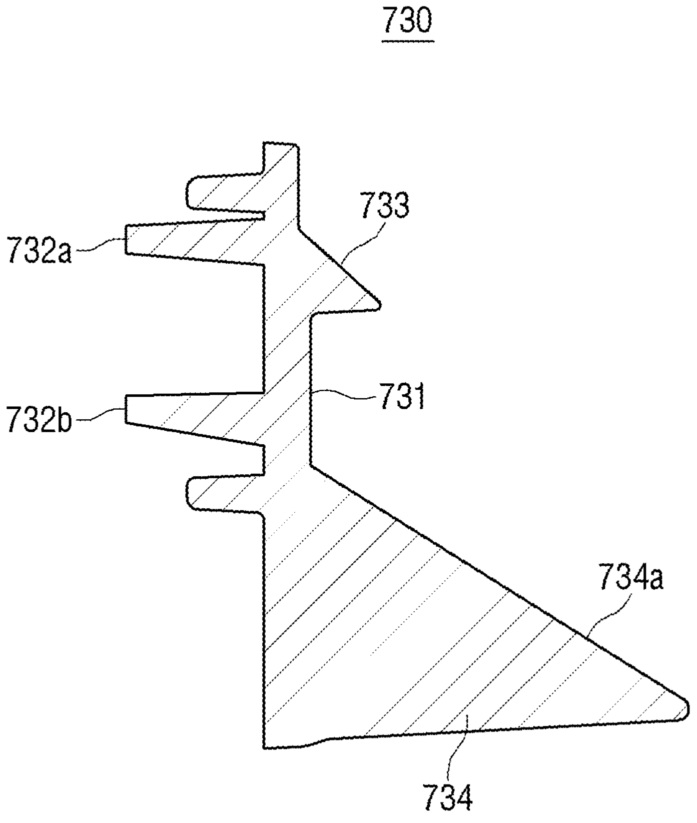
FIG. 28 illustrates the first lens of the high beam lamp shown in FIG. 27 according to another exemplary embodiment of the present disclosure.

FIG. 27 shows a high beam lamp according to another exemplary embodiment of the present disclosure, and FIG. 28 shows a first lens shown in FIG. 27. Referring to FIGS. 27 and 28, the high beam lamp 700 may include a first light source 711, a second light source 712, a substrate 720, a first lens 730, a lens bracket 750, and a second lens 760.

Since the shapes and functions of the first light source 711, the second light source 712, the substrate 720, the first lens 730, the lens bracket 750, and the second lens 760 are the same or similar to those of the first light source 511, the second light source 512, the substrate 520, the first lens 530, the lens bracket 550, and the second lens 560 of the exemplary embodiment described above, the differences will be mainly described.

The first lens 730 may include a lens body 731, a first guide rod 732*a*, a second guide rod 732*b*, a first reflector 733, and a second reflector 734.

The lens body 731 may be provided in a substantially parallel plate shape. The first guide rod 732*a*, the second guide rod 732*b*, the first reflector 733, and the second reflector 734 may protrude outward from major surfaces of the lens body 731. The first guide rod 732*a* and the second guide rod 732*b* may protrude from the lens body 731 toward the first light source 711 and the second light source 712, respectively, and the first reflector 733 and the second reflector 734 may protrude from the lens body 731 in a direction different (e.g., in an opposite direction) from the first guide rod 732*a* and the second guide rod 732*b*.

The first guide rod 732*a* may guide the first light 810 to the first reflector 733. The second guide rod 732*b* may guide the second light to the lens body 731. The first reflector 733 may reflect the first light 810 guided by the first guide rod 732*a*. Since the shapes and functions of the lens body 731, the first guide rod 732*a*, the second guide rod 732*b*, and the first reflector 733 are the same or similar to those of the lens body 531, the first guide rod 532*a*, the second guide rod 532*b*, and the first reflector 533 of the exemplary embodiment described above, the detailed descriptions thereof will be omitted.

The second reflector 734 may reflect the first reflected light 811 emitted from the first reflector 733 to form the second reflected light 812. The second reflected light 812 may be irradiated to the second lens 760. The first lens 730 may be made of a silicone material. The first reflected light 811 that is delivered to the second reflector 734 through the air may be reflected from the reflective surface 734*a* of the second reflector 734, which is a medium different from the air.

Alternatively, the second reflector 734 may include a reflective layer formed by applying a reflective material. For example, a white paint may be applied to the reflective surface 734*a* of the second reflector 734 to form a reflective layer. The reflective layer may reflect most of the incident first reflected light 811 and absorb only a part of the incident first reflected light 811.

The reflective surface 734*a* of the second reflector 734 may have a flat or curved surface. When the reflective surface 734*a* is implemented as a curved surface, it may be provided in a shape, in which the center portion is recessed inward. The geometry of the second reflected light 812 incident on the second lens 760 may be determined based on the shape of the reflective surface 734*a*. For example, the second reflected light 812 emitted from the reflective surface 734*a* may be concentrated to a specific area of the second lens 760 or uniformly incident over the entire area of the second lens 760 depending on the shape of the reflective surface 734*a*.

The first light 810 irradiated from the first light source 711 may be guided to the first reflector 733 by the first guide rod 732*a* of the first lens 730. The first reflector 733 may reflect the first light 810 to form the first reflected light 811. Specifically, the first reflector 733 may reflect the first light 810 incident in the horizontal direction in a downwardly inclined direction to form the first reflected light 811. A part of the first light 810 incident on the first reflector 733 may not be reflected by the first reflector 733, but may be transmitted through the first reflector 733. The light transmitted through the first reflector 733 may be blocked from being directly delivered to the second lens 760 by the cover unit 752 of the lens bracket 750. When the first light 810 is directly delivered to the second lens 760, a concentrated light area by the corresponding light may be included in the sub low beam pattern (SLP). However, as the first light 810 is blocked from being directly delivered to the second lens 760 by the cover unit 752, the concentrated light area may be prevented from being formed in the sub low beam pattern (SLP).

The second reflector 734 provided in the first lens 730 may reflect the first reflected light 811 to form the second reflected light 812. Specifically, the second reflector 734 may reflect the first reflected light 811 in an upwardly inclined direction to form the second reflected light 812. The second reflected light 812 emitted from the second reflector 734 may pass through a point that is higher than the focal point (F2) of the second lens 760 and be incident on the second lens 760. Accordingly, the second reflected light 812 incident on the second lens 760 may be refracted by the second lens 760 to form a sub low beam light 813 that is inclined with respect to the optical axis (Dx) of the second lens 760. Further, the sub low beam light 813 may form a sub low beam pattern (SLP) that is mapped to an area that is higher than the low beam pattern (LP).

Although the exemplary embodiments of the present disclosure have been described with reference to the above and the accompanying drawings, those of ordinary skill in the art, to which the present disclosure pertains, can understand that the present disclosure may be implemented in other specific forms without changing the technical spirit or essential features. Therefore, it should be understood that the exemplary embodiments described above are illustrative and non-limiting in all respects.

What is claimed is:

1. An automotive lamp comprising:

a first light source for generating light;

a light guide unit including a first rod, to which the light is incident;

a reflector unit for reflecting the light emitted from the light guide unit through the first rod; and a lens unit for forming a first beam pattern by transmitting at least a part of the light reflected by the reflector unit through the lens unit;

wherein the reflector unit comprises, a first reflector member for reflecting a first light, which is a part of the light emitted from the light guide unit through the first rod;

a second reflector member disposed in front of the first reflector member for reflecting a second light, which is a part of the light emitted from the light guide unit through the first rod, and the first light reflected from the first reflector member; and a third reflector member disposed below the second reflector member for reflecting the first light and the second light reflected from the second reflector member.

2. The automotive lamp of claim 1, wherein the first reflector member is disposed between the second reflector member and the third reflector member.

3. The automotive lamp of claim 1, wherein the third reflector member comprises, a front reflector part for reflecting a part of light reflected from the second reflector member to the lens unit; and a rear reflector part for reflecting light reflected to a rear of the front reflector member among the light reflected from the second reflector member.

4. The automotive lamp of claim 3, wherein a slope of the front reflector part is greater than a slope of the rear reflector part with respect to an optical axis of the lens unit.

5. The automotive lamp of claim 3, further comprising:

at least one second light source for generating light, wherein the light guide unit further comprises at least one second rod, to which the light generated from the second light source is incident, and wherein the lens unit forms a second beam pattern by transmitting through the lens unit the light emitted from the light guide unit through the second rod.

6. The automotive lamp of claim 5, wherein a third light, which is a part of the light emitted from the light guide unit through the second rod, is incident on the lens unit, and wherein a fourth light, which is a part of the light emitted from the light guide unit through the second rod, is reflected by the rear reflector part and is incident on the lens unit.

7. The automotive lamp of claim 6, wherein the fourth light is irradiated to an upper area of the second beam pattern.

8. The automotive lamp of claim 5, wherein the first beam pattern comprises a sub low beam pattern, and wherein the second beam pattern comprises a high beam pattern.

9. The automotive lamp of claim 1, wherein the reflector unit further comprises, a first connection member for connecting the first reflector member and the second reflector member, and forming a first through hole, through which the first light and the second light pass; and a second connection member for connecting the first reflector member and the third reflector member, and forming a second through hole, through which the first light and the second light reflected from the second reflector member and third reflector member pass.

10. The automotive lamp of claim 9, wherein the second connection member includes a protrusion that protrudes in a direction toward the light guide unit.

11. An automotive lamp comprising:

a first light source for irradiating a first light;

a first lens for reflecting the first light by a first reflector to form a first reflected light;

a second reflector for reflecting the first reflected light to form a second reflected light;

a second lens for transmitting the second reflected light to form a first beam pattern;

a second light source for irradiating a second light that is transmitted through the first lens and the second lens to form a second beam pattern; and a lens bracket for fixing the first lens to the first light source.

12. The automotive lamp of claim 11, wherein the first lens is made of a silicone material.

13. The automotive lamp of claim 11, wherein the lens bracket comprises a cover unit for covering a reflective surface of the first reflector.

14. The automotive lamp of claim 11, wherein the second reflector is provided integrally with the first lens.

15. The automotive lamp of claim 11, wherein the second reflector is provided integrally with the lens bracket.

16. The automotive lamp of claim 15, wherein the lens bracket is made of a resin material or a metal material, and wherein the second reflector comprises a reflective layer formed by applying a reflective material.

17. The automotive lamp of claim 11, wherein the first reflector reflects the first light that is incident in a substantially horizontal direction in a downwardly inclined direction to form the first reflected light, and wherein the second reflector reflects the first reflected light in an upwardly inclined direction to form the second reflected light.

18. The automotive lamp of claim 11, wherein the first beam pattern comprises a sub low beam pattern, and wherein the second beam pattern comprises a high beam pattern.

19. The automotive lamp of claim 11, wherein the first lens includes a first guide rod for guiding the first light to the first reflector.

20. The automotive lamp of claim 19, wherein the first light that is incident into the first lens through the first guide rod is reflected on a reflective surface of the first reflector and emitted to outside of the first lens.

* * * * *